United States Patent
Kubota et al.

(10) Patent No.: US 12,468,071 B2
(45) Date of Patent: Nov. 11, 2025

(54) ANTI-GLARE ANTIREFLECTION MEMBER, POLARIZING PLATE, SURFACE PLATE, AND IMAGE DISPLAY DEVICE WHICH ARE PROVIDED WITH ANTI-GLARE ANTIREFLECTION MEMBER, AND METHOD FOR SELECTING ANTI-GLARE ANTIREFLECTION MEMBER

(71) Applicant: DAI NIPPON PRINTING CO., LTD., Tokyo (JP)

(72) Inventors: Shosei Kubota, Kashiwa (JP); Yoshiko Tanaka, Tokorozawa (JP); Takashi Kuroda, Moriya (JP); Akinobu Ushiyama, Moriya (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 547 days.

(21) Appl. No.: 17/905,530

(22) PCT Filed: Mar. 9, 2021

(86) PCT No.: PCT/JP2021/009107
§ 371 (c)(1),
(2) Date: Sep. 2, 2022

(87) PCT Pub. No.: WO2021/182424
PCT Pub. Date: Sep. 16, 2021

(65) Prior Publication Data
US 2023/0124385 A1  Apr. 20, 2023

(30) Foreign Application Priority Data

Mar. 9, 2020  (JP) .................................. 2020-040205

(51) Int. Cl.
*G02B 1/111* (2015.01)
*G02B 5/30* (2006.01)
*B29D 11/00* (2006.01)

(52) U.S. Cl.
CPC ............ *G02B 1/111* (2013.01); *G02B 5/3025* (2013.01); *B29D 11/00865* (2013.01); *B29D 11/00951* (2013.01)

(58) Field of Classification Search
CPC .... G02B 1/111; G02B 5/3025; G02B 5/0242; G02B 5/0247; G02B 5/0278;
(Continued)

(56) References Cited

U.S. PATENT DOCUMENTS

2005/0233069 A1* 10/2005 Mikami .................. G02B 1/111
427/160
2007/0146887 A1* 6/2007 Ikeda ...................... G02B 1/111
359/586

(Continued)

FOREIGN PATENT DOCUMENTS

JP  2005-301246  10/2005
JP  2006-267556  10/2006
(Continued)

OTHER PUBLICATIONS

Examiner provided machine translation of Ryoko, JP 2006267556 A (Year: 2006).*
(Continued)

*Primary Examiner* — Balram T Parbadia
(74) *Attorney, Agent, or Firm* — HSML P.C.

(57) ABSTRACT

Provided is an anti-glare antireflection member capable of suppressing coloring in viewing in an oblique direction, and suppressing visual recognition of local luminescent spots. The anti-glare antireflection member comprises an anti-glare layer and a low refractive index layer on a substrate. The
(Continued)

average of Δd is 7.0 nm or more and 40.0 nm or less, where Δd is a thickness difference of the low refractive index layer in an arbitrary 2 mm×2 mm region of the anti-glare anti refractive index layer.

12 Claims, 3 Drawing Sheets

(58) Field of Classification Search
CPC .......... G02B 5/0294; G02B 5/02; G02B 5/30; B29D 11/00865; B29D 11/00951; G02F 1/1335; G09F 9/00; H05B 33/02; H10H 20/81; H10K 50/00; H10K 59/00; H01L 27/32; H01L 51/50
See application file for complete search history.

(56) References Cited

U.S. PATENT DOCUMENTS

| | | | | |
|---|---|---|---|---|
| 2007/0291363 A1* | 12/2007 | Asakura | ............... | G02B 5/0278 359/586 |
| 2008/0247045 A1* | 10/2008 | Suzuki | ................. | G02B 5/0278 359/601 |

FOREIGN PATENT DOCUMENTS

| | | |
|---|---|---|
| JP | 2008-224718 | 9/2008 |
| JP | 2010-139878 | 6/2010 |
| JP | 2016-218179 | 12/2016 |
| JP | 2018-055056 | 4/2018 |
| JP | 2018-197829 | 12/2018 |
| JP | 2020-008877 | 1/2020 |
| WO | 2008/084604 | 7/2008 |
| WO | 2008/126528 | 10/2008 |

OTHER PUBLICATIONS

Examiner provided machine translation of Ren, JP 2008224718 A (Year: 2008).*
Examiner provided machine translation of Watanabe, JP 5298857 B2 (Year: 2013).*
International Search Report of PCT/JP2021/009107, May 11, 2021, 7 pages including English translation.

* cited by examiner

[Fig. 1]
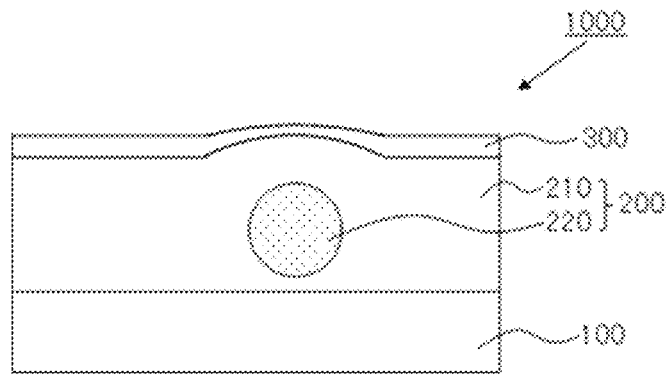
[Fig. 2]
(a)
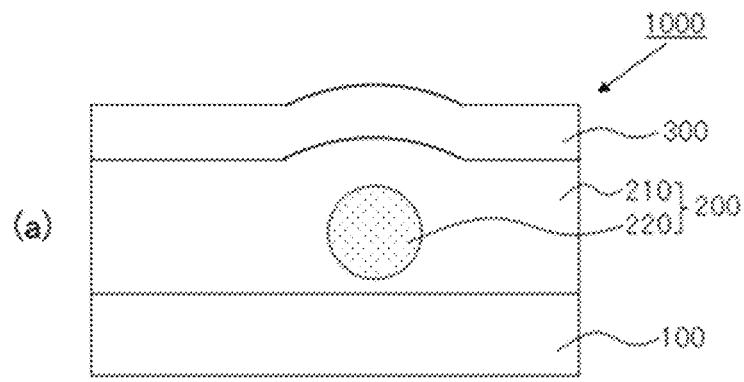
(b)
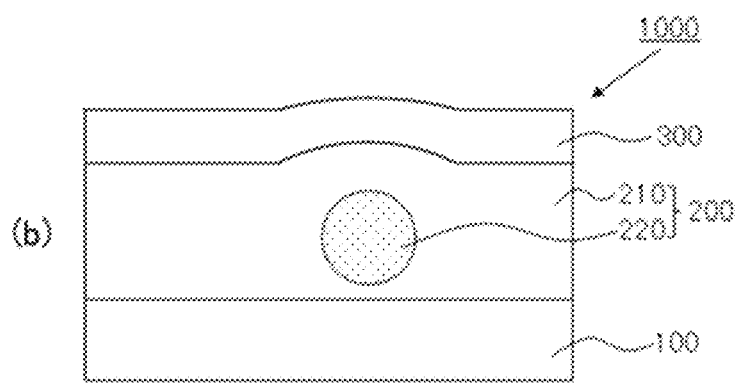
(c)
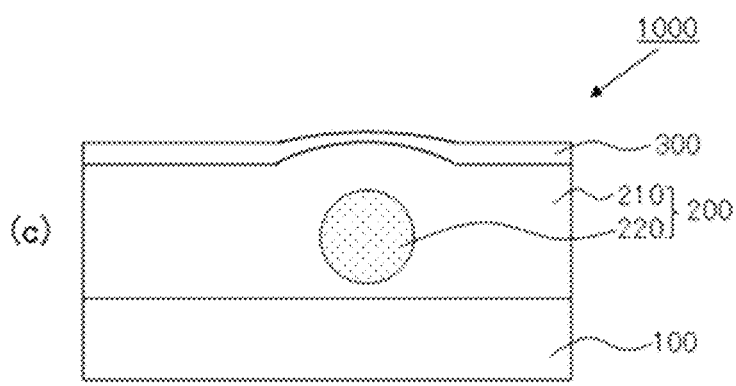

[Fig. 3]
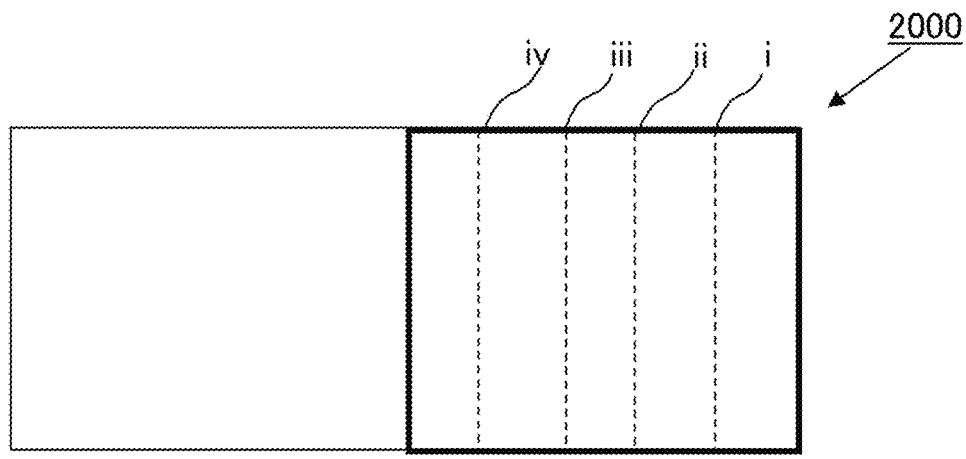
[Fig. 4]
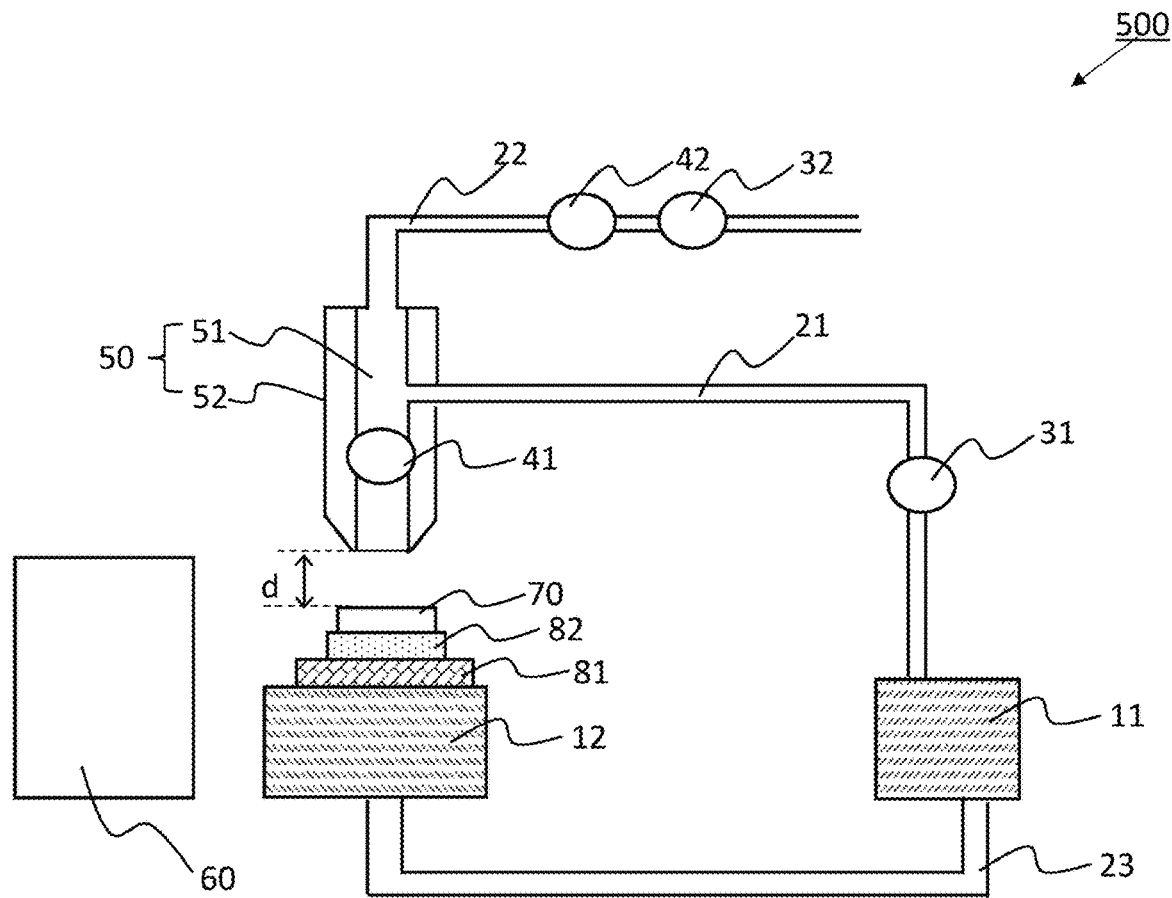

[Fig. 5]
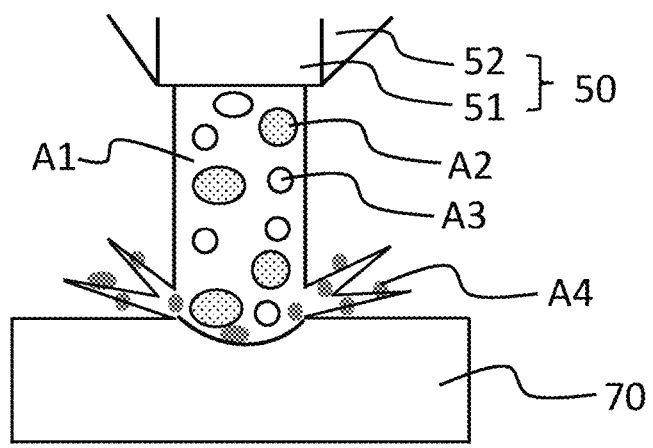

ANTI-GLARE ANTIREFLECTION MEMBER, POLARIZING PLATE, SURFACE PLATE, AND IMAGE DISPLAY DEVICE WHICH ARE PROVIDED WITH ANTI-GLARE ANTIREFLECTION MEMBER, AND METHOD FOR SELECTING ANTI-GLARE ANTIREFLECTION MEMBER

TECHNICAL FIELD

The present disclosure relates to an anti-glare antireflection member, a polarizing plate, a surface plate and an image display device each comprising the anti-glare antireflection member, and a method for selecting an anti-glare antireflection member.

BACKGROUND ART

It is known that antireflection members are provided on a surface of a display device in display devices such as liquid crystal display devices, organic EL display devices, micro LED display devices, mini LED display devices, and display devices using quantum dots, showcases, and the like, for the purpose of an improvement in visibility.

In recent years, not only televisions but also touch panel type image display devices, for example, in-car displays such as car navigation equipment, digital signage displays, tablets, and smartphones, which are operated by direct contact of hands of users with screens are widespread. These image display devices are also provided with an antireflection member.

Examples of such antireflection members include those obtained by sequentially forming a hardcoat layer and an antireflection layer on a substrate (e.g. Patent Literatures 1 and 2).

The antireflection members of Patent Literatures 1 and 2 can suppress reflection of outside light, but have a problem that backgrounds are reflected because the surface is flat and smooth.

In this connection, an anti-glare antireflection film obtained by sequentially forming an anti-glare layer and an antireflection layer on a substrate has been proposed (e.g. Patent Literature 3).

CITATION LIST

Patent Literature

PTL 1: JP 2016-218179 A
PTL 2: JP 2020-8877 A
PTL 3: JP 2018-197829 A

DISCLOSURE OF INVENTION

Technical Problem

The anti-glare antireflection film of Patent Literature 3 can reduce reflection of backgrounds as compared to Patent literatures 1 and 2. However, the anti-glare antireflection film of Patent Literature 3 often has a problem that coloring is visually recognized in viewing in an oblique direction, or local luminescent spots are visually recognized.

In view of the problems described above, an object of the present disclosure is to provide an anti-glare antireflection member capable of suppressing coloring in viewing in an oblique direction and suppressing visual recognition of local luminescent spots, a polarizing plate, a surface plate and an image display device each comprising the anti-glare antireflection member, and a method for selecting an anti-glare antireflection member.

Solution to Problem

For solving the problems described above, the present disclosure provides the following [1] to [5].

[1] An anti-glare antireflection member comprising an anti-glare layer and a low refractive index layer on a substrate, wherein an average of $\Delta d$ is 7.0 nm or more and 40.0 nm or less, where $\Delta d$ is a thickness difference of the low refractive index layer in an arbitrary 2 mm×2 mm region of the anti-glare antireflection member.

[2] A polarizing plate comprising a polarizer, a first transparent protection plate arranged on one side of the polarizer, and a second transparent protection plate arranged on the other side of the polarizer, wherein at least one selected from the group consisting of the first transparent protection plate and the second transparent protection plate is the anti-glare antireflection member according to [1], and the anti-glare antireflection member is arranged so that the surface on the low refractive index layer side faces the opposite side of the polarizer.

[3] A surface plate for an image display device in which an anti-glare antireflection member is bonded on a resin plate or a glass plate, wherein the anti-glare antireflection member is the anti-glare antireflection member according to [1], and the anti-glare antireflection member is arranged so that the surface on the low refractive index layer side faces the opposite side of the resin plate or the glass plate.

[4] An image display device comprising the anti-glare antireflection member according to [1] arranged on a display element such that the low refractive index layer side faces the opposite side of the display element, and the anti-glare antireflection member is arranged on a surface of the image display device.

[5] A method for selecting an anti-glare antireflection member, comprising the following steps (1) and (2):
(1) measuring a thickness difference $\Delta d$ of a low refractive index layer in an arbitrary 2 mm×2 mm region of an anti-glare antireflection member comprising an anti-glare layer and the low refractive index layer on a substrate, and calculating an average of $\Delta d$; and
(2) selecting an anti-glare antireflection member satisfying a requirement that the average of $\Delta d$ be 7.0 nm or more and 40.0 nm or less.

Advantageous Effects of Invention

An anti-glare antireflection member of the present disclosure, and a polarizing plate, a surface plate and an image display device comprising the anti-glare antireflection member is capable of suppressing coloring in viewing in an oblique direction and suppressing visual recognition of local luminescent spots. A method for selecting an anti-glare antireflection member according to the present disclosure enables stable selection of an anti-glare antireflection member capable of suppressing coloring in viewing in an oblique direction and suppressing visual recognition of local luminescent spots.

BRIEF DESCRIPTION OF DRAWINGS

FIG. 1 is a sectional view schematically illustrating one embodiment of an anti-glare antireflection member of the present disclosure.

FIG. 2 (a)-(b) are diagrams illustrating a process through which a thickness difference of a low refractive index layer is generated.

FIG. 3 is a diagram illustrating portions where height profiles are measured for calculation of Δd.

FIG. 4 is a schematic sectional view of an apparatus for measuring an erosion ratio of a substrate.

FIG. 5 is an imaginary picture of a state in which the substrate is abraded by a test liquid containing pure water and spherical silica, which is sprayed from a spraying unit.

DESCRIPTION OF EMBODIMENT

Hereinafter, an anti-glare antireflection member of the present disclosure will be described in detail.

A numerical value range herein designated as "AA to BB" means "AA or more and BB or less".

[Anti-Glare Antireflection Member]

The anti-glare antireflection member of the present disclosure is an anti-glare antireflection member comprising an anti-glare layer and a low refractive index layer on a substrate, wherein the average of Δd is 7.0 nm or more and 40.0 nm or less, where Δd is a thickness difference of the low refractive index layer in an arbitrary 2 mm×2 mm region of the anti-glare antireflection member.

FIG. 1 is a sectional view schematically illustrating one embodiment of an anti-glare antireflection member of the present disclosure. An anti-glare antireflection member 1000 in FIG. 1 comprises an anti-glare layer 200 and a low refractive index layer 300 in this order on a substrate 100. The anti-glare layer 200 comprises a binder resin 210 and particles 220.

The low refractive index layer 300 of the anti-glare antireflection member of FIG. 1 is not uniform in thickness. Specifically, the low refractive index layer on the convex portion of the anti-glare layer 200 has a small thickness, whereas the low refractive index layer on the flat portion of the anti-glare layer 200 has a large thickness. That is, the low refractive index layer of FIG. 1 has a certain thickness difference Δd.

The thickness difference Δd of the low refractive index layer may be generated through the process of FIGS. 2(a) to 2(c).

First, as shown in FIG. 2(a), the wet thickness of the low refractive index layer on the convex portion of the anti-glare layer 200 is equal to the wet thickness of the low refractive index layer on the flat portion of the anti-glare layer 200 at the time when a coating solution for a low refractive index layer is applied onto the anti-glare antireflection layer 200. In this state, Δd is substantially 0. The wet thickness is a thickness in a state with a solvent that is a component other than solid contents.

Next, as shown in FIG. 2(b), a part of the coating solution for a low refractive index layer which is present on the convex portion of the anti-glare layer, of the coating solution for a low refractive index layer which has been applied onto the anti-glare layer 200, flows down to the flat portion of the anti-glare layer 200 before the start of drying and during drying. As a result, the wet thickness of the low refractive index layer on the convex portion of the antiglare layer 200 is smaller than the wet thickness of the low refractive index layer on the flat portion of the anti-glare layer 200.

Next, from the state of FIG. 2(b), drying of the coating solution for a low refractive index layer is carried out, and the binder resin is cured if necessary, to form a low refractive index layer, leading to the state of FIG. 2(c). In FIG. 2(c), the dry thickness of the low refractive index layer on the convex portion of the anti-glare layer 200 is smaller than the dry thickness of the low refractive index layer on the flat portion of the anti-glare layer 200. In this way, the thickness difference Δd of the low refractive index layer is formed.

In the present specification, the thickness difference Δd of the low refractive index layer means a thickness difference of the low refractive index layer of the completed anti-glare antireflection member. For example, when the low refractive index layer is formed by the wet method as described above, the thickness difference of the low refractive index layer of the anti-glare antireflection member completed by drying the coating solution for a low refractive index layer, and performing curing if necessary is Δd.

The thickness difference Δd of the low refractive index layer can be adjusted by the surface shape of the anti-glare layer, the leveling property of the low refractive index layer, and the like. There are a plurality of means for easily setting the average of Δd within the range set forth in the present disclosure. These means will be described later.

<Substrate>

The substrate serves as a support for the anti-glare layer and the low refractive index layer.

As the substrate, one having a high light transmittance is suitable. Specifically, the substrate is preferably one having a total light transmittance of 90% or more, as determined according to JIS K7361-1: 1997.

As the substrate, one having a low haze is suitable. Specifically, the substrate has a haze of preferably 3.0% or less, more preferably 2.0% or less, as determined according to JIS K7136: 2000.

Examples of the substrate include plastic and glass. The substrate is preferably one formed of plastic because it is lightweight and makes production easy. Hereinafter, the plastic substrate is sometimes referred to as a plastic film. The glass plate as a substrate includes so called "ultrathin glass". Ultrathin glass is sold by, for example, Samsung Electronics Co., Ltd. and Nippon Electric Glass Co., Ltd.

The plastic film can be formed from one or more selected from the group consisting of various resins such as polyolefin-based resins such as polyethylene and polypropylene, vinyl-based resins such as polyvinyl chloride, polyvinylidene chloride, polyvinyl alcohol, an ethylene-vinyl acetate copolymer and an ethylene-vinyl alcohol copolymer, polyester-based resins such as polyethylene terephthalate, polyethylene naphthalate and polybutylene terephthalate, acryl-based resins such as polymethyl (meth)acrylate and polyethyl(meth)acrylate, styrene-based resins such as polystyrene, polyamide-based resins such as nylon 6 and nylon 66, cellulose-based resins such as triacetyl cellulose, polycarbonate-based resins, polyimide-based resins, polyamide-imide-based resins, aramid-based resins, and cycloolefin resins obtained from cycloolefins such as norbornene and dicyclopentadiene.

For improving the mechanical strength, the plastic film is preferably a stretched plastic film, more preferably a biaxially stretched plastic film.

Among the plastic films, polyester films are preferable. Among them, biaxially stretched polyester films having good mechanical strength are preferable. Among them, biaxially stretched polyethylene terephthalate films are preferable.

For suppressing optical anisotropy, a plastic film such as a biaxially stretched polyester film has an in-plane phase difference of preferably 1600 nm or less, more preferably 1400 nm or less, more preferably 1200 nm or less, more preferably 1000 nm or less.

The in-plane phase difference is represented by the following expression (1), where nx is a refractive index in a slow axis direction that is a direction along which the plastic film has the largest refractive index, ny is a refractive index in a fast axis direction that is a direction orthogonally crossing the slow axis direction, T is a thickness [nm] of the plastic film.

$$\text{In-plane phase difference}(Re) = (nx - ny) \times T [\text{nm}] \quad (1)$$

An in-plane phase difference (Re) of 1600 nm or less means a small difference between nx and ny. By reducing the difference between nx and ny, deterioration of the appearance depending on an observation direction can be more easily suppressed because the difference between the reflectances of the plastic film in the slow axis direction and the fast axis direction can be reduced. Examples of the appearance include luminescent spots and whitening.

In a plastic film such as a biaxially stretched polyester film, nx−ny is preferably 0.040 or less, more preferably 0.035 or less, further preferably 0.030 or less, for reducing the in-plane phase difference. Examples of the method for setting the nx−ny of the biaxially stretched polyester film in the above range include a method in which the film is stretched at substantially the same ratio in the longitudinal direction and the lateral direction.

For suppressing warpage, the thickness of the plastic film is preferably 5 μm or more, more preferably 20 μm or more, further preferably 30 μm or more. For thickness reduction, the thickness of the plastic film is preferably 300 μm or less, more preferably 200 μm or less, further preferably 150 μm or less, still further preferably 90 μm or less.

The plastic film may be a plate-like plastic film having a thickness of more than 500 μm. In foldable applications and the like that require flexibility, the thickness of the plastic film is preferably 10 μm or more and 40 μm or less. When glass is used in a part on which the anti-glare antireflection member is mounted, the thickness of the plastic film is preferably 40 μm or more and 100 μm or less for preventing scattering of glass.

For improving the strength, the thickness of the glass substrate is preferably 5 μm or more, more preferably 10 μm or more, further preferably 30 μm or more. For thickness reduction, the thickness of the glass substrate is preferably 300 μm or less, more preferably 200 μm or less, further preferably 150 μm or less, still further preferably 90 μm or less. In foldable applications and the like that require flexibility, the thickness of the glass substrate is preferably 10 μm or more and 40 μm or less, more preferably 20 μm or more and 40 μm or less.

For improving the mechanical strength, the substrate has a tensile elastic modulus of preferably 3.5 GPa or more, more preferably 4.0 GPa or more. The tensile elastic modulus of the substrate is not particularly limited, and is preferably 5.5 GPa or less, more preferably 4.5 GPa or less.

In the present specification, the tensile elastic modulus of the substrate means a tensile elastic modulus as determined according to JIS K 7127: 1999. The tensile elastic modulus measurement sample has a length of 150 mm and a width of 10 mm. The tension rate is 50 mm/min, and the chuck-to-chuck distance is 100 mm.

The tensile elastic modulus of the substrate is preferably in the range of 3.5 GPa or more and 5.5 GPa or less, 3.5 GPa or more and 4.5 GPa or less, 4.0 GPa or more and 5.5 GPa or less, or 4.0 GPa or more and 4.5 GPa or less.

For suppressing deformation of members in the image display device, the value of the water-vapor transmission rate of the substrate is preferably 200 g/m²/day or less, more preferably 100 g/m²/day or less. The lower limit of the water-vapor transmission rate of the substrate is not particularly limited, and is preferably 5 g/m²/day or more, more preferably 10 g/m²/day or more.

In the present specification, the water-vapor transmission rate means a water-vapor transmission rate as determined according to JIS K7129-2: 2019. The temperature and relative humidity condition in measurement of the water-vapor transmission rate is 40° C. and 90%. Before measurement of the water-vapor transmission rate, the measurement sample is exposed to an atmosphere at a temperature of 23° C.±5° C. and a relative humidity of 40% or more and 65% or less for 30 minutes or more.

The water-vapor transmission rate can be measured by, for example, a water-vapor transmission rate measurement apparatus manufactured by MOCON, Inc. (trade name: PERMATRAN).

The water-vapor transmission rate of the substrate is preferably in the range of 5 g/m²/day or more and 200 g/m²/day or less, 5 g/m²/day or more and 100 g/m²/day or less, 10 g/m²/day or more and 200 g/m²/day or less, or 10 g/m²/day or more and 100 g/m²/day or less.

<Erosion Ratio>

The plastic film as a substrate has an $E_{0-20}$ of preferably 1.4 μm/g or more, where $E_{0-20}$ is an average of erosion ratios of the plastic film at a surface to a depth of 20 μm.

In the present specification, $E_{0-20}$ is measured under the following measurement conditions.

<Measurement Conditions>

A test liquid obtained by mixing pure water, a dispersion liquid and spherical silica having an average particle size within 4.2 μm±8%, at a mass ratio of 968:2:30 is put in a container. The test liquid in the container is fed to a nozzle. Compressed air is fed into the nozzle to accelerate the test liquid in the nozzle and spray a predetermined amount of the test liquid vertically to the plastic film from a spray hole at the tip of the nozzle, so that the spherical silica in the test liquid collides against the plastic film. The transverse section shape of the nozzle is a square of 1 mm×1 mm, and the distance between the spray hole and the plastic film is 4 mm. The flow rates of the test liquid and the compressed air supplied to the nozzle, the pressure of the compressed air, and the pressure of the test liquid in the nozzle are set to predetermined values adjusted by calibration described later.

After a predetermined amount of the test liquid is sprayed, the spraying of the test liquid is temporarily stopped.

After the spraying of the test liquid is temporarily stopped, cross-section profiles of portions of the plastic film where the spherical silica in the test liquid has collided are measured.

Until the depth of the cross-section profile exceeds 20 μm, operations each having the following three steps are carried out: a step of spraying a predetermined amount of the test liquid from the spray nozzle; a step of temporarily stopping the spraying of the test liquid after spraying a predetermined amount of the test liquid; and a step of measuring the cross-section profile after temporarily stopping the spraying of the test liquid. In each of the cycles where the depth of the cross-section profile is 20 μm or less, the depth (μm) of the cross-section profile increased in each cycle is divided by the amount (g) of the test liquid sprayed in each cycle to calculate the erosion ratio (μm/g) of the plastic film. The $E_{0-20}$ is calculated by averaging the erosion ratios of the plastic film in each cycle where the depth of the cross-section profile is 20 μm or less.

<Calibration>

The test liquid is put in the container. The test liquid in the container is fed into the nozzle. Compressed air is fed into the nozzle to accelerate the test liquid in the nozzle and spray an arbitrary amount of the test liquid vertically to a 2 mm-thick acrylic plate from a spray hole at the tip of the nozzle, so that spherical silica in the test liquid collides against the acrylic plate. The transverse section shape of the nozzle is a square of 1 mm×1 mm, and the distance between the spray hole and the acrylic plate is 4 mm.

After an arbitrary amount of the test liquid is sprayed, the spraying of the test liquid is temporarily stopped. After the spraying of the test liquid is temporarily stopped, the cross-section profiles of portions of the acrylic plate at which the spherical silica in the test liquid has collided are measured.

The depth (μm) of the cross-section profile is divided by the arbitrary amount (g) to calculate the erosion ratio (μm/g) of the acrylic plate.

The requirement for acceptance is that the erosion ratio of the acrylic plate be within 1.88 (μm/g)±5%, and the flow rates of the test liquid and the compressed air, the pressure of the compressed air and the pressure of the test liquid in the nozzle are adjusted so that the erosion ratio of the acrylic plate is within the above-described range, thereby performing calibration.

Hereinafter, the technical significance of the erosion ratio measurement conditions and the erosion ratio calculated under the measurement conditions will be described with reference to FIG. 4. Examples of the erosion ratio measurement apparatus as in FIG. 4 include product number "MSE-A203" of MSE Tester from Palmeso Co., Ltd.

As erosion ratio measurement conditions in the present disclosure, first, a test liquid obtained by mixing pure water, a dispersant and spherical silica having an average particle size within 4.2 μm±8%, at a mass ratio of 968:2:30 is put in a container (11). It is preferable that the test liquid be stirred in the container (11).

As the pure water, common pure water can be used. The pure water generally has a specific resistance value of 0.1 MΩ·cm or more and 15 MΩ·cm or less.

The dispersant is not particularly limited as long as it is capable of dispersing spherical silica. Examples of the dispersant include trade name "Demol N" from Wako Pure Chemical Industries, Ltd.

The phrase "the average particle size is within 4.2 μm±8%" specifically means that the average particle size is 3.864 μm or more and 4.536 μm or less.

In the erosion ratio measurement conditions in the present specification, the "average particle size of spherical silica" is measured as a volume average value d50 in particle size distribution measurement by laser diffractometry, and means a so-called "median diameter".

The spherical silica is preferably one in which in the result of the particle size distribution measurement, the width between particle sizes at a frequency of 50 is within 4.2 μm±10%, where the frequency of a particle size at the maximum frequency is defined as 100. The "width between particle sizes at a frequency of 50" is represented by "X–Y (μm)", where "X is a particle size at a frequency of 50 and in a positive direction with respect to the particle size at a frequency of 100" and "Y is a particle size at a frequency of 50 and in a negative direction with respect to the particle size at a frequency of 100". In the present specification, the "width between particle sizes at a frequency of 50" is sometimes referred to a "full width at half height in a particle size distribution".

Examples of the spherical silica having an average particle size within 4.2 μm±8% include model number "MSE-BS-5-3" designated by Palmeso Co., Ltd. Examples of the spherical silica corresponding to the model number "MSE-BS-5-3" designated by Palmeso Co., Ltd. include product number "BS5-3" from Potters-Ballotini Co., Ltd.

The test liquid in the container is fed into a nozzle (51). The test liquid can be fed into the nozzle through, for example, a test liquid pipe (21). It is preferable that a flowmeter (31) for measuring the flow rate of the test liquid be arranged between the container (11) and the nozzle (51). The flow rate of the test liquid is set to a value adjusted by the calibration.

In FIG. 4, the nozzle (51) is arranged in a housing (52) forming a spraying unit.

Compressed air is fed into the nozzle (51). The compressed air is fed into the nozzle through, for example, a compressed air pipe (22). In the nozzle, the location at which the compressed air is fed is preferably upstream of the location at which the test liquid is fed. The term "upstream" refers to a side farther from the spray hole of the nozzle.

It is preferable that a flowmeter (32) for measuring the flow rate of the compressed air and a pressure gauge (42) for measuring the pressure of the compressed air be arranged on the route of passage of the compressed air to the nozzle (51). The compressed air can be supplied by an air compressor or the like (not shown).

The flow rate and the pressure of the compressed air are set to values adjusted by the calibration.

When the compressed air is fed into the nozzle (51), the test liquid is accelerated while being mixed by the compressed air. The accelerated test liquid is sprayed from the spray hole at the tip of the nozzle (51) to collide vertically to a plastic film (70). The plastic film is abraded mainly by spherical silica particles in the test liquid.

It is preferable that a pressure gauge (41) for measuring the pressure of the test liquid in the nozzle be arranged in the nozzle (51). It is preferable that the pressure gauge (41) be located downstream of the location at which the compressed air is fed and the location at which the test liquid is fed.

The pressure of the test liquid in the nozzle (51) is set to a value adjusted by the calibration.

The test liquid sprayed from the spray hole at the tip of the nozzle (51) is mixed with air and sprayed in the form of a mist. Thus, the collision pressure of the spherical silica particles on the plastic film can be reduced. Accordingly, the amount of abrasion of the plastic film by one spherical silica particle can be kept very small. FIG. 5 is an imaginary picture of a state in which the plastic film (70) is abraded by a test liquid containing pure water (A1) and spherical silica (A2), which is sprayed from a spraying unit (50). In FIG. 5, symbol A3 denotes air, and symbol A4 denotes an abraded plastic film.

Since the test liquid contains water that is excellent in cooling effect, it is possible to substantially eliminate deformation and degeneration of the plastic film which is caused by heat from the collision. That is, abnormal abrasion of the plastic film can be substantially eliminated. Water also has a role of cleaning the surface of the abraded plastic film to achieve stable abrasion. In addition, water has a role of accelerating spherical silica particles and controlling the fluid of the test liquid.

Since an enormous number of spherical silica particles collide against the plastic film, it is possible to eliminate the influence of a subtle difference in physical properties between individual spherical silica particles.

Further, for the measurement conditions in the present disclosure, the flow rate of the test liquid supplied to the nozzle, the flow rate of the compressed air supplied to the nozzle, the pressure of the compressed air supplied to the nozzle, and the pressure of the test liquid in the nozzle are set to values adjusted by the calibration, the transverse section shape of the nozzle is set to a square of 1 mm×1 mm, and the distance between the spray hole and the plastic film is set to 4 mm to identify elements having an influence on the amount of abrasion of the plastic film. The distance is a distance denoted by "d" in FIG. 4, and means a vertical distance between the spray hole at the tip of the nozzle and the plastic film.

From the above, it can be said that the measurement conditions in the present disclosure are measurement conditions which enable statistically stable abrasion marks to be formed on the plastic film.

The plastic film (70) may be mounted on a specimen mounting table (81) of a measurement apparatus (500). It is preferable that laminate be produced by bonding the plastic film to a support (82) such as a stainless plate, and mounted on the specimen mounting table (81).

It is preferable that the test liquid sprayed to the plastic film (70) be collected in a reception vessel (12), and returned to the container (11) through a returning pipe (23).

As the measurement conditions in the present disclosure, it is required that the spraying of the test liquid be temporarily stopped after a predetermined amount of the test liquid is sprayed, and cross-section profiles of portions of the plastic film where the spherical silica in the test liquid has collided be measured after the spraying of the test liquid is temporarily stopped.

The cross-section profile means a transverse section shape of a plastic film abraded by a test liquid. The plastic film is abraded mainly by spherical silica particles in the test liquid.

The cross-section profile can be measured by, for example, a cross-section profile acquiring unit (60) such as a stylus-type surface shape measurement apparatus or a laser interference-type surface shape measurement apparatus. The cross-section profile acquiring unit (60) is typically located away from the plastic film (70) during spraying of the test liquid. Thus, it is preferable that at least one of the plastic film (70) and the cross-section profile acquiring unit (60) be movable.

The cross-section profile measuring means of product number "MSE-A203" of the MSE tester from Palmeso Co. Ltd. is of stylus type.

Further, until the depth of the cross-section profile exceeds 20 μm, operations each having the following three steps are carried out: a step of spraying a predetermined amount of the test liquid from the spray nozzle; a step of temporarily stopping the spraying of the test liquid after spraying a predetermined amount of the test liquid; and a step of measuring the cross-section profile after temporarily stopping the spraying of the test liquid.

By carrying out the operations, the erosion ratio of the plastic film in each cycle can be measured, and a variation in erosion ratio of the plastic film can be calculated.

The cycle may be continued even after the depth of the cross-section profile exceeds 20 μm, and it is preferable to stop the cycle at the time when the depth of the cross-section profile exceeds 20 μm. The reason for measurement "at a surface to a depth of 20 μm in the plastic film" is that the physical properties of the plastic film tend to become more stable as going inward while being likely to vary in the vicinity of the surface.

In the present specification, the erosion ratio in each cycle can be represented by the following [expression 1].

Erosion ratio(μm/g) in each cycle=depth(μm) of cross-section profile increased in each cycle/ amount (g) of test liquid sprayed in each cycle  [expression 1]

In expression 1, the depth (μm) of cross-section profile increased in each cycle" means a value represented by "y−x", where x is a depth (μm) of the cross-section profile in the nth cycle, and y is a depth (μm) of the cross-section profile at the (n+1)th cycle. Regarding the first cycle, the depth (μm) of the cross-section profile in the first cycle corresponds to the "depth (μm) of the cross-section profile increased in each cycle".

In the present specification, the depth of the cross-section profile in the nth cycle means a depth of the deepest point of the cross-section profile in the nth cycle. n is an integer of 1 or more.

In expression 1, the "amount (g) of test liquid sprayed in each cycle" is "fixed" in principle, and may slightly vary from cycle to cycle.

The amount of the test liquid sprayed in each cycle is not particularly limited. The lower limit is preferably 0.5 g or more, more preferably 1.0 g or more, and the upper limit is preferably 3.0 g or less, more preferably 2.0 g or less.

In the measurement conditions in the present disclosure, erosion ratios (μm/g) in each cycle where the depth of the cross-section profile is 20 μm or less are calculated. The erosion ratios in each cycle where the depth of the cross-section profile is 20 μm or less are averaged to calculate $E_{0-20}$.

The cycle is carried out until the depth of the cross-section profile exceeds 20 μm, and the data of the cycle where the depth of the cross-section profile exceeds 20 μm is excluded from data for calculating $E_{0-20}$.

In general, a softer plastic film is more likely to be scratched, whereas harder one is less likely to be scratched. The present inventors have examined whether a value obtained in evaluation including that of a depth direction by use of Picodentor, such as Martens hardness, indentation hardness or an elastic recovery workload, can be used as an index of pencil hardness. However, the parameter such as Martens hardness, indentation hardness or an elastic recovery workload cannot be used as an index of pencil hardness.

A plastic film tends to have increased strength when stretched. Specifically, a uniaxially stretched plastic film tends to have better pencil hardness than an unstretched plastic film, and a biaxially stretched plastic film tends to have better pencil hardness than a uniaxially stretched plastic film. However, there have cases where even a biaxially stretched plastic film does not have sufficient pencil hardness.

The present inventors have examined the erosion ratio as an index of pencil hardness of the plastic film. Since as described above, a softer plastic film is more likely to be scratched, whereas harder one is less likely to be scratched, the pencil hardness may become better as the erosion ratio decreases. However, the present inventors have found that conversely, by increasing the erosion ratio $E_{0-20}$ to 1.4 μm/g or more, the pencil hardness of the plastic film can be improved. The present inventors have also found that for the erosion ratio of the plastic film, a biaxially stretched plastic film exhibits a larger value than a uniaxially stretched plastic film, and whether a biaxially stretched plastic film has good or poor pencil hardness can be determined by the erosion ratio.

The reason why the erosion ratio of the plastic film is correlated with the pencil hardness may be as follows.

As measurement conditions in the present disclosure, a test liquid containing water and spherical silica is mixed with air and sprayed in the form of a mist as described above. Thus, the collision pressure of spherical silica particles on the plastic film is kept low. Accordingly, it is considered that when the plastic film is soft, stress of collision of spherical silica against the plastic film is easily distributed, so that the plastic film is hardly abraded, leading to a decrease in erosion ratio. On the other hand, it is considered that when the plastic film is hard, stress of collision of spherical silica against the plastic film is hardly distributed, so that the plastic film is easily abraded, leading to an increase in erosion ratio.

It is considered that the difference in erosion ratio in the biaxially stretched plastic film is ascribable to a difference in elongation degree of the molecular chain, a difference in degree of orientation of molecules, and the like. For example, in a biaxially stretched plastic film, molecules are elongated in the plane in principle, but there may be molecules which locally, are not sufficiently elongated in the plane. It is considered that if the proportion of molecules which locally, are not sufficiently elongated in the plane as described above increases, the biaxially stretched plastic film may locally soften, leading to a decrease in erosion ratio. It is considered that even biaxially stretched plastic films having equivalent in-plane phase differences may exhibit different erosion ratios due to a local difference in orientation of molecules.

$E_{0-20}$ of the plastic film is preferably 1.4 μm/g or more for improving the pencil hardness.

The $E_{0-20}$ is preferably 1.6 μm/g or more, more preferably 1.8 μm/g or more, further preferably 1.9 μm/g or more, still further preferably 2.0 μm/g or more.

The $E_{0-20}$ is preferably 3.0 μm/g or less, more preferably 2.5 μm/g or less, further preferably 2.2 μm/g or less for making the plastic film less breakable.

In a preferred embodiment, $E_{0-20}$ is in the numerical range of, for example, 1.4 μm/g or more and 3.0 μm/g or less, 1.4 μm/g or more and 2.5 μm/g or less, 1.4 μm/g or more and 2.2 μm/g or less, 1.6 μm/g or more and 3.0 μm/g or less, 1.6 μm/g or more and 2.5 μm/g or less, 1.6 μm/g or more and 2.2 μm/g or less, 1.8 μm/g or more and 3.0 μm/g or less, 1.8 μm/g or more and 2.5 μm/g or less, 1.8 μm/g or more and 2.2 μm/g or less, 1.9 μm/g or more and 3.0 μm/g or less, 1.9 μm/g or more and 2.5 μm/g or less, 1.9 μm/g or more and 2.2 μm/g or less, 2.0 μm/g or more and 3.0 μm/g or less, 2.0 μm/g or more and 2.5 μm/g or less, or 2.0 μm/g or more and 2.2 μm/g or less.

When the erosion ratio of the plastic film is in the above-described ranges, stress on the low refractive index layer is easily relaxed in the case where stress is applied to the anti-glare antireflection member of the present disclosure. Thus, when the erosion ratio of the plastic film is in the above-described ranges, breakage of outer shell layers of hollow particles in the low refractive index layer can be easily suppressed. The anti-glare antireflection member of the present disclosure has a predetermined thickness difference in the low refractive index layer, and therefore is likely to satisfy the relationship of "density of hollow particles per unit area of low refractive index layer on convex portion of anti-glare layer<density of hollow particles per unit area of low refractive index layer on flat portion of anti-glare layer". Thus, the erosion ratio of the plastic film is preferably in the above-described ranges in that breakage of outer shell layers of hollow particles in the low refractive index layer on flat portion of anti-glare layer is suppressed.

Examples of the case where stress is applied to the anti-glare antireflection member include a case where the anti-glare antireflection member is curved or folded. For example, when the anti-glare antireflection member is applied to an image display device having a curved shape or a foldable image display device, the anti-glare antireflection member may be curved or folded.

By setting the erosion ratio of the plastic film to suppress breakage of outer shell layers of hollow particles in the low refractive index layer as described above, coloring in viewing in an oblique direction can be further suppressed, and visual recognition of local luminescent spots can be more easily suppressed.

The above-described calibration is performed before the erosion ratio is measured. For example, calibration can be conducted as follows.

<Calibration>

The test liquid is put in the container. The test liquid in the container is fed into the nozzle. Compressed air is fed into the nozzle to accelerate the test liquid in the nozzle and spray an arbitrary amount of the test liquid vertically to an 2 mm-thick acrylic plate from a spray hole at the tip of the nozzle, so that the spherical silica in the test liquid collides against the acrylic plate. The transverse section shape of the nozzle is a square of 1 mm×1 mm, and the distance between the spray hole and the acrylic plate is 4 mm.

After an arbitrary amount of the test liquid is sprayed, the spraying of the test liquid is temporarily stopped. After the spraying of the test liquid is temporarily stopped, cross-section profiles of portions of the acrylic plate where the spherical silica in the test liquid has collided are measured.

The depth (μm) of the cross-section profile is divided by the arbitrary amount (g) to calculate the erosion ratio (μm/g) of the acrylic plate.

The acceptance condition is that the erosion ratio of the acrylic plate is within 1.88 (μm/g)±5%. The flow rates of the test liquid and the compressed air, the pressure of the compressed air and the pressure of the test liquid in the nozzle are adjusted so that the erosion ratio of the acrylic plate is within the above-described range, thereby performing calibration.

The test liquid used in the calibration is identical to a test liquid used in the subsequently applied measurement condition.

The measurement apparatus used in the calibration is identical to a measurement apparatus used in the subsequently applied measurement condition.

The calibration is different from the subsequently applied measurement condition in that for example, a 2 mm-thick acrylic plate which is a standard specimen is used as a specimen in the calibration, whereas a plastic film is used as a specimen in the measurement condition.

The 2 mm-thick acrylic plate as a standard specimen is preferably a polymethyl methacrylate plate. The 2 mm-thick acrylic plate as a standard specimen is preferably one having an AcE of 1.786 μm/g or more and 1.974 μm/g or less, where AcE is an average of an erosion ratio of the acrylic plate which is measured under the following measurement condition A. Examples of the spherical silica in the following measurement condition A include model number "MSE-BS-5-3" designated by Palmeso Co., Ltd. Examples of the spherical silica corresponding to the model number "MSE-BS-5-3" designated by Palmeso Co., Ltd. include product number "BS5-3" from Potters-Ballotini Co., Ltd.

<Measurement Condition A>

A test liquid obtained by mixing pure water, a dispersant and spherical silica having an average particle size within 4.2 μm±8%, at a mass ratio of 968:2:30 is put in a container. The test liquid in the container is fed to a nozzle. Compressed air is fed into the nozzle to accelerate the test liquid in the nozzle and spray a predetermined amount of the test liquid vertically to the acrylic plate from a spray hole at the tip of the nozzle, so that the spherical silica in the test liquid collides against the acrylic plate. The transverse section shape of the nozzle is a square of 1 mm×1 mm, and the distance between the spray hole and the acrylic plate is 4 mm. The flow rates of the test liquid and the compressed air supplied to the nozzle, the pressure of the compressed air, and the pressure of the test liquid in the nozzle are as follows: the flow rate of the test liquid is 100 ml/min or more and 150 ml/min or less, the flow rate of the compressed air is 4.96 L/min or more and 7.44 L/min or less, the pressure of the compressed air is 0.184 MPa or more and 0.277 MPa or less, and the pressure of the test liquid in the nozzle is 0.169 MPa or more and 0.254 MPa or less.

4 g of the test liquid is sprayed, and the spraying of the test liquid is then temporarily stopped.

After the spraying of the test liquid is temporarily stopped, cross-section profiles of portions of the acrylic plate where the spherical silica in the test liquid has collided are measured.

The depth (μm) of the cross-section profile is divided by 4 g as an amount of the test liquid sprayed to calculate AcE that is an erosion ratio of the acrylic plate. The unit of AcE is "μm/g".

In the calibration, operations are carried out in which with the acceptance condition being that the erosion ratio of the acrylic plate is within 1.88 (μm/g)±5%, the flow rates of the test liquid and the compressed air, the pressure of the compressed air and the pressure of the test liquid in the nozzle are adjusted so that the erosion ratio of the acrylic plate is within the above-described range.

The phrase "the erosion ratio is within 1.88 (μm/g)±5%" specifically means that the erosion ratio is 1.786 (μm/g) or more and 1.974 (μm/g) or less.

<$\sigma_{0\text{-}20}/E_{0\text{-}20}$>

The plastic film has a $\sigma_{0\text{-}20}/E_{0\text{-}20}$ of preferably 0.100 or less, where $\sigma_{0\text{-}20}$ is a variation in erosion ratio calculated from erosion ratios of the plastic film at a surface to a depth of 20 μm.

In the present specification, $\sigma_{0\text{-}20}$ can be calculated from the erosion ratios of each cycle where the depth of the cross-section profile is 20 μm or less in the measurement conditions.

$\sigma_{0\text{-}20}/E_{0\text{-}20}$ represents a coefficient of variation in erosion ratio, and smaller $\sigma_{0\text{-}20}/E_{0\text{-}20}$ means that the erosion ratio is less likely to vary in the thickness direction of the plastic film. When $\sigma_{0\text{-}20}/E_{0\text{-}20}$ is 0.100 or less, the erosion ratio in the thickness direction stabilizes, so that the pencil hardness can be easily improved.

If regions having locally poor strength are present in the plastic film, the regions having poor strength are likely to trigger a physical change such as deformation when stress is applied to the anti-glare antireflection member. As a result, scratches, cracks and the like may be generated in the low refractive index layer. $\sigma_{0\text{-}20}/E_{0\text{-}20}$ is preferably 0.100 or less in that defects triggered by the regions having locally poor strength can be easily suppressed.

The upper limit of $\sigma_{0\text{-}20}/E_{0\text{-}20}$ is more preferably 0.080 or less, further preferably 0.070 or less, still further preferably 0.060 or less, still further preferably 0.055 or less.

The film quality of the plastic film in the thickness direction becomes more uniform as the value of $\sigma_{0\text{-}20}/E_{0\text{-}20}$ decreases. When the film quality of the plastic film in the thickness direction is uniform, stress tends to easily propagate in the thickness direction. Thus, $\sigma_{0\text{-}20}/E_{0\text{-}20}$ is preferably 0.020 or more, more preferably 0.035 or more.

In a preferred embodiment, $\sigma_{0\text{-}20}/E_{0\text{-}20}$ is in the numerical range of, for example, 0.020 or more and 0.100 or less, 0.020 or more and 0.080 or less, 0.020 or more and 0.070 or less, 0.020 or more and 0.060 or less, 0.020 or more 0.055 or less, 0.035 or more and 0.100 or less, 0.035 or more and 0.080 or less, 0.035 or more and 0.070 or less, 0.035 or more and 0.060 or less, 0.035 or more and 0.055 or less.

For setting the erosion ratio of the plastic film within the above-described ranges, it is preferable to elongate molecules evenly in the plane of the plastic film.

The plastic film can be produced by, for example, common sequential biaxial stretching. In stretching in the running direction in sequential biaxial stretching, there is a tendency that the erosion ratio decreases when the stretching time is shortened and the erosion ratio increases when the stretching time is increased. This may be because molecules are hardly elongated evenly in the plane of the plastic film when the stretching time is short, and molecules are easily elongated evenly in the plane of the plastic film when the stretching time is long. That is, for setting $E_{0\text{-}20}$ to 1.4 μm/g or more, it is preferable to increase the stretching time. Further, $E_{0\text{-}20}$ is more easily set to 1.4 μm/g or more by increasing the stretching time while making the draw ratio moderately large to the extent that physical properties do not vary.

The substrate may be one subjected to common chemical treatment and common physical treatment for the purpose of, for example, improving adhesion to the anti-glare layer. A primer layer may be formed between the substrate and the anti-glare layer for the purpose of, for example, improving adhesion.

<Anti-Glare Layer>

The anti-glare layer is a layer having an asperity shape.

The anti-glare layer can be formed by, for example, (A) a method using an emboss roll and an embossed film, (B) etching, (C) molding with a mold, (D) formation of a coating film by coating. Among these methods, (C) molding with a mold is suitable when importance is placed on achievement of a stable surface shape, and (D) formation of a coating film by coating is suitable when importance is placed on productivity and adaptation to a variety of products.

The anti-glare layer may be formed only of a resin, and preferably comprises a binder resin and particles.

<<Binder Resin>>

The binder resin preferably comprise a cured product of a curable resin composition. Examples of the cured product of a curable resin composition include a cured product of a thermosetting resin composition and a cured product of an ionizing radiation-curable resin composition, and a cured product of an ionizing radiation-curable resin composition is preferable for obtaining better mechanical strength.

The thermosetting resin composition is a composition comprising at least a thermosetting resin, and the resin composition is cured when heated.

Examples of the thermosetting resin include an acrylic resin, a urethane resin, a phenol resin, a urea melamine resin, an epoxy resin, an unsaturated polyester resin, and a silicone resin. In the thermosetting resin composition, a curing agent is added to the curable resin if necessary.

The ionizing radiation-curable resin composition is a composition comprising a compound having an ionizing radiation-curable functional group. In the present specification, the "compound having an ionizing radiation-curable functional group" is also referred to as an "ionizing radiation-curable compound".

The ionizing radiation means an electromagnetic wave or a charged particle radiation which has an energy quantum capable of polymerizing or crosslinking molecules. An ultraviolet ray or an electron beam is typically used, and in addition, an electromagnetic wave such as an X-ray or a γ-ray, or a charged particle radiation such as an α-ray or an ion beam can be used.

Examples of the ionizing radiation-curable functional group include ethylenically unsaturated bond groups such as a (meth)acryloyl group, a vinyl group and an allyl group, an epoxy group, and an oxetanyl group. The ionizing radiation-curable compound is preferably a compound having an ethylenically unsaturated bond group, more preferably a compound having two or more ethylenically unsaturated bond groups, and in particular, a polyfunctional (meth) acrylate-based compound having two or more ethylenically unsaturated bond groups is further preferable.

As the polyfunctional (meth)acrylate-based compound, either a monomer or an oligomer can be used, and an oligomer is preferable. That is, the anti-glare layer preferably comprises a cured product of a polyfunctional (meth) acrylate oligomer. A cured product of a polyfunctional (meth)acrylate oligomer is capable of improving the surface hardness of the anti-glare antireflection member, and suppressing excessive cure shrinkage of the anti-glare layer to inhibit the elevation difference of the asperity of the anti-glare layer from becoming excessively large. Thus, when the anti-glare layer comprises a cured product of a polyfunctional (meth)acrylate oligomer, the average of Δd can be easily set to 40.0 nm or less.

The ratio of the cured product of a polyfunctional (meth) acrylate oligomer to the total binder resin in the anti-glare layer is preferably 60 mass % or more, more preferably 80 mass % or more, further preferably 90 mass % or more, still further preferably 100 mass %.

The anti-glare layer may comprise binder resins other than the cured product of a polyfunctional (meth)acrylate oligomer as long as the effects of the present disclosure are not inhibited.

The polyfunctional (meth)acrylate oligomer has a weight average molecular weight of preferably 500 or more and 5000 or less, more preferably 1000 or more and 3000 or less.

When the weight average molecular weight of the oligomer is 500 or more, formation of a sharply sloping asperity by excessive cure shrinkage of the anti-glare layer can be suppressed to easily set the average of Δd to 40.0 nm or less. If the weight average molecular weight of the oligomer is excessively large, the leveling property of the anti-glare layer tends to be deteriorated, resulting in steepening of the convex portion of the anti-glare layer. Thus, when the weight average molecular weight of the oligomer is 5000 or less, the average of Δd can be easily set to 40.0 nm or less.

In the present specification, the weight average molecular weight means a polystyrene-equivalent value determined by gel permeation chromatography.

The weight average molecular weight of the polyfunctional (meth)acrylate oligomer is preferably in the range of 500 or more and 5000 or less, 500 or more and 3000 or less, 1000 or more and 5000 or less, or 1000 or more and 3000 or less.

Examples of the difunctional (meth)acrylate monomer, among the polyfunctional (meth)acrylate-based compounds, include ethylene glycol di(meth)acrylate, bisphenol A tetraethoxydiacrylate, bisphenol A tetrapropoxydiacrylate, and 1,6-hexanediol diacrylate.

Examples of the tri-or-more-functional (meth)acrylate monomer include trimethylolpropane tri(meth)acrylate, pentaerythritol tri(meth)acrylate, pentaerythritol tetra(meth) acrylate, dipentaerythritol hexa(meth)acrylate, dipentaerythritol tetra(meth)acrylate, and isocyanuric acid-modified tri (meth)acrylate.

The (meth)acrylate monomer may be one in which a part of the molecular backbone is modified, and it is possible to use a (meth)acrylate monomer modified with ethylene oxide, propylene oxide, caprolactone, isocyanuric acid, alkyl, cyclic alkyl, an aromatic group, bisphenol, or the like.

Examples of the polyfunctional (meth)acrylate oligomer include (meth)acrylate-based polymers such as urethane (meth)acrylate, epoxy (meth)acrylate, polyester (meth)acrylate and polyether (meth)acrylate.

The urethane (meth)acrylate is obtained by, for example, reaction of a polyhydric alcohol and an organic diisocyanate with hydroxy (meth)acrylate.

A monofunctional (meth)acrylate may be added as an ionizing radiation-curable compound for the purpose of, for example, adjusting the viscosity of the coating solution for an anti-glare layer.

Examples of the monofunctional (meth)acrylate include methyl (meth)acrylate, ethyl (meth)acrylate, propyl (meth) acrylate, butyl (meth)acrylate, pentyl(meth)acrylate, hexyl (meth)acrylate, cyclohexyl (meth)acrylate, 2-ethylhexyl (meth)acrylate, lauryl (meth)acrylate, stearyl (meth)acrylate, and isobornyl (meth)acrylate.

The ionizing radiation-curable compounds can be used alone, or in combination of two or more thereof. In addition to the ionizing radiation-curable compound, a polymer may be added to the coating solution for an anti-glare layer for adjusting the viscosity. Examples of the polymer include those having a weight average molecular weight of more than 5000 and 200000 or less.

When the ionizing radiation-curable compound is an ultraviolet ray-curable compound, the ionizing radiation-curable composition preferably comprises additives such as a photopolymerization initiator and a photopolymerization accelerator.

Examples of the photopolymerization initiator include one or more selected from the group consisting of acetophenone, benzophenone, an α-hydroxyalkylphenone, Michler's ketone, benzoin, benzildimethylketal, benzoyl benzoate, an α-acyloxime ester, anthraquinone, halogenoketone, thioxanthone, and the like. Among them, an α-hydroxyalkylphenone which is unlikely to turn yellow is preferable.

The photopolymerization accelerator may enhance the curing rate through the reduction of polymerization inhibition due to the air on curing, and examples thereof include one or more selected from isoamyl p-dimethylaminobenzoate and ethyl p-dimethylaminobenzoate.

<<Particle>>

The average particle size of the particles is preferably 0.5 μm or more and 5.0 μm or less, more preferably 1.0 μm or more and 4.0 μm or less, further preferably 1.0 μm or more and 3.0 μm or less.

The simple term "particles" in the present specification means a single particulate material or an assembly of particulate materials which can form an asperity on the surface of the anti-glare layer. In other words, the simple term "particles" in the present specification does not mean so-called primary particles having a particle size of 0.1 μm or less. Examples of the "single particulate material which can form an asperity on the surface of the anti-glare layer" include organic particles. Examples of the "assembly of particulate materials which can form an asperity on the surface of the anti-glare layer" include an "aggregate formed by aggregation of inorganic fine particles", and an "aggregate formed by aggregation of inorganic fine particles on the periphery of an organic particle with the organic particle as a core.

When the average particle size of the particles is 0.5 μm or more, glare-proofness can be easily improved. Particles having an average particle size of more than 0.1 μm and less than 0.5 μm may form an aggregate which causes excessive glare-proofness and haze.

If the average particle size of the particles is excessively large, the average of Δd tends to increase because the asperity shape of the anti-glare layer is likely to steepen, so that the wet state low refractive index layer formed on the convex portion on the anti-glare layer is likely to flow into the flat portion of the anti-glare layer. Thus, when the average particle size of the particles is 5.0 μm or less, the average of Δd can be easily set to 40.0 nm or less. If the average particle size of the particles is excessively large, the influence of the refractive index of the particles themselves grows, so that haze caused by scattering is likely to occur.

Examples of the inorganic fine particles forming the aggregate include particles of silica, alumina, zirconia and titania, and silica is preferable. Examples of the silica include fumed silica and solid silica. The primary particle size of the inorganic fine particles forming the aggregate is preferably 1 nm or more and 100 nm or less, more preferably 1 nm or more and 50 nm or less.

The average particle size of the particles is preferably in the range of 0.5 μm or more and 5.0 μm or less, 0.5 μm or more and 4.0 μm or less, 0.5 μm or more and 3.0 μm or less, 1.0 μm or more and 5.0 μm or less, 1.0 μm or more and 4.0 μm or less, or 1.0 μm or more and 3.0 μm or less.

In a relatively large image display device of 50 inches or more, importance may be placed on color clearness and image quality, and regarding glare-proofness, low glare-proofness which causes no more than blurring of the contour of an object may be desired. In the aforementioned case, the average particle size of the particles is preferably 1.0 μm or more and 4.0 μm or less.

The average particle size of the particles can be calculated by, for examples, the following operations (A1) to (A3);
(A1) a transmission observation image of the anti-glare film is imaged with an optical microscope, where the magnification is preferably 500 to 2000 times;
(A2) 10 particles are randomly extracted on an observation image, and the particle sizes of the individual particles are calculated, where a cross-section of the particle is sandwiched between arbitrary two parallel straight lines, the two straight lines are combined so as to maximize the distance between the two straight lines, and the distance between the two straight lines is measured as a particle size; and
(A3) the observation image of the same sample is subjected to the same operation as above five times on different screens, and a value obtained from the number average of the particle sizes of a total of 50 particles is determined as an average particle size of the particles.

The primary particle size of the inorganic fine particles forming an aggregate can be determined in accordance with the later-described measurement method (B1) to (B3) for hollow silica particles and non-hollow silica particles.

In the particles, the coefficient of variation in particle size is preferably 13% or less, more preferably 12% or less, further preferably 11% or less.

When the coefficient of variation in particle size is 13% or less, steepening of the asperity shape of the anti-glare layer can be suppressed to easily set the average of Δd to 40.0 nm or less.

The coefficient of variation in particle size can be obtained by the following expression from a standard deviation calculated from the 50 particles used in the calculation of an average particle size in (A1) to (A3) above, and the average particle size.

Coefficient of variation (%)=(standard deviation/average particle size)×100

As the particles, either organic particles or inorganic particles can be used, and organic particles are preferable because dispersion control is easily performed. For the particles, two or more types of particles having different materials can be used in combination, or two or more types of particles having different average particle sizes can be used in combination.

Examples of the organic particles include particles composed of polymethyl methacrylate, a polyacryl-styrene copolymer, a melamine resin, polycarbonate, polystyrene, polyvinyl chloride, a benzoguanamine-melamine-formaldehyde condensate, silicone, a fluorine-based resin, a polyester-based resin, and the like.

Examples of the inorganic particles include particles composed of silica, alumina, zirconia, titania, and the like.

Examples of the shape of the particle include a spherical shape, an elliptic shape, and an irregular shape, and a spherical shape is preferable. Spherical particles are capable of suppressing steepening of the asperity shape of the anti-glare layer to easily set the average of Δd to 40.0 nm or less.

The content of the particles is preferably 0.1 parts by mass or more and 7.5 parts by mass or less, more preferably 0.8 parts by mass or more and 6.0 parts by mass or less, further preferably 1.0 part by mass or more and 5.0 parts by mass or less, based on 100 parts by mass of the binder resin.

When the content of the particles is 0.6 parts by mass or more, the glare-proofness can be easily improved. When the content of the particles is 7.5 parts by mass or less, steepening of the asperity shape of the anti-glare layer by excessive aggregation of the particles can be suppressed to easily set the average of Δd to 40.0 nm or less.

The content of the particles based on 100 parts by mass of the binder resin is preferably in the range of 0.1 parts by mass or more and 7.5 parts by mass or less, 0.1 parts by mass or more and 6.0 parts by mass or less, 0.1 parts by mass or more and 5.0 parts by mass or less, 0.8 parts by mass or more and 7.5 parts by mass or less, 0.8 parts by mass or more and 6.0 parts by mass or less, 0.8 parts by mass or more and 5.0 parts by mass or less, 1.0 parts by mass or more and 7.5 parts by mass or less, 1.0 parts by mass or more and 6.0 parts by mass or less, or 1.0 parts by mass or more and 5.0 parts by mass or less.

The average thickness of the anti-glare layer is preferably 1 μm or more and 10 μm or less, more preferably 3 μm or more and 8 μm or less, further preferably 4 μm or more and 6 μm or less.

The average thickness of the anti-glare layer is preferably in the range of 1 μm or more and 10 μm or less, 1 μm or more and 8 μm or less, 1 μm or more and 6 μm or less, 3 μm or more and 10 μm or less, 3 μm or more and 8 μm or less, 3

µm or more and 6 µm or less, 4 µm or more and 10 µm or less, 4 µm or more and 8 µm or less, or 4 µm or more and 6 µm or less.

The average thickness of each of the layers forming the anti-glare antireflection member, such as the anti-glare layer and the low refractive index layer, can be determined by, for example, randomly selecting 20 points on a photograph of a cross-section of the anti-glare antireflection member under a "scanning transmission electronic microscope (STEM)", and calculating an average value of these points. It is to be noted that the 20 portions should be selected not to focusing on certain locations.

The accelerating voltage and the magnification in STEM may be set depending on a layer to be measured. For example, in the case of the anti-glare layer, the accelerating voltage in STEM is preferably 10 kv or more and 30 kv or less, and the magnification in STEM is preferably 1000 times or more and 7000 times or less.

The content of the particles is preferably 0.1 parts by mass or more and 7.5 parts by mass or less, more preferably 0.8 parts by mass or more and 6.0 parts by mass or less, further preferably 1.0 part by mass or more and 5.0 parts by mass or less, based on 100 parts by mass of the binder resin.

When the content of the particles is 0.1 parts by mass or more, the glare-proofness can be easily improved. When the content of the particles is 7.5 parts by mass or less, steepening of the asperity shape of the anti-glare layer by excessive aggregation of the particles can be suppressed to easily set the average of $\Delta d$ to 40.0 nm or less.

The content of the particles based on 100 parts by mass of the binder resin is preferably in the range of 0.1 parts by mass or more and 7.5 parts by mass or less, 0.1 parts by mass or more and 6.0 parts by mass or less, 0.1 parts by mass or more and 5.0 parts by mass or less, 0.8 parts by mass or more and 7.5 parts by mass or less, 0.8 parts by mass or more and 6.0 parts by mass or less, 0.8 parts by mass or more and 5.0 parts by mass or less, 1.0 parts by mass or more and 7.5 parts by mass or less, 1.0 parts by mass or more and 6.0 parts by mass or less, or 1.0 parts by mass or more and 5.0 parts by mass or less.

The anti-glare layer may comprise a leveling agent such as a fluorine-based leveling agent, a silicone-based leveling agent or a fluorine/silicone-based leveling agent.

The content of the leveling agent is preferably 0.01 parts by mass or more and 0.20 parts by mass or less, more preferably 0.02 parts by mass or more and 0.10 parts by mass or less, further preferably 0.03 parts by mass or more and 0.07 parts by mass, based on 100 parts by mass of the binder resin.

The content of the leveling agent based on 100 parts by mass of the binder resin is preferably in the range of 0.01 parts by mass or more and 0.20 parts by mass or less, 0.01 parts by mass or more and 0.10 parts by mass or less, 0.01 parts by mass or more and 0.07 parts by mass or less, 0.02 parts by mass or more and 0.20 parts by mass or less, 0.02 parts by mass or more and 0.10 parts by mass or less, 0.02 parts by mass or more and 0.07 parts by mass or less, 0.03 parts by mass or more and 0.20 parts by mass or less, 0.03 parts by mass or more and 0.10 parts by mass or less, or 0.03 parts by mass or more and 0.07 parts by mass or less.

The anti-glare layer may comprise other additives as long as the effects of the present disclosure are not inhibited. Examples of the additives include an ultraviolet ray absorbent, an antioxidant, and a light stabilizer.

The refractive index of the anti-glare layer is preferably 1.48 or more and 1.62 or less, more preferably 1.50 or more and 1.54 or less, further preferably 1.52 or more and 1.53 or less. When the refractive index of the anti-glare layer is in the above-described range, and the refractive index of the low refractive index layer is in a range as described later, visual recognition of coloring in viewing in an oblique direction can be easily suppressed, and the luminous reflectance Y value can be easily reduced.

The refractive index of the anti-glare layer is preferably in the range of 1.48 or more and 1.62 or less, 1.48 or more and 1.54 or less, 1.48 or more and 1.53 or less, 1.50 or more and 1.62 or less, 1.50 or more and 1.54 or less, 1.50 or more and 1.53 or less, 1.52 or more and 1.62 or less, 1.52 or more and 1.54 or less, or 1.52 or more and 1.53 or less.

<<Solvent>>

For the coating solution for an anti-glare layer, a solvent is typically used for adjusting the viscosity, and enabling the components to be dissolved or dispersed.

Examples of the solvent include ketones such as acetone, methyl ethyl ketone, methyl isobutyl ketone and cyclohexanone; ethers such as dioxane and tetrahydrofuran; aliphatic hydrocarbons such as hexane; alicyclic hydrocarbons such as cyclohexane; aromatic hydrocarbons such as toluene and xylene; halogenated carbons such as dichloromethane and dichloroethane; esters such as methyl acetate, ethyl acetate and butyl acetate; alcohols such as isopropanol, butanol and cyclohexanol; cellosolves such as methyl cellosolve and ethyl cellosolve; glycol ethers such propylene glycol monomethyl ether acetate; cellosolve acetates; sulfoxides such as dimethyl sulfoxide; and amides such as dimethylformamide and dimethylacetamide, and the solvent may be a mixture thereof.

If the time required for drying the solvent in the coating solution for an anti-glare layer is excessively long, particles may be excessively aggregated, leading to an increase in average of $\Delta d$. If the time required for drying the solvent in the coating solution for an anti-glare layer is excessively short, aggregation of the particles may be insufficient, leading to a decrease in average of $\Delta d$. Thus, it is preferable that a solvent having a high evaporation rate and a solvent having a low evaporation rate be mixed, and used as the solvent in the coating solution for an anti-glare layer.

In the present specification, the solvent having a high evaporation rate means a solvent having an evaporation rate of 120 or more when the evaporation rate of butyl acetate is defined as 100. In the present specification, the solvent having a low evaporation rate means a solvent having an evaporation rate of less than 120 when the evaporation rate of butyl acetate is defined as 100.

In the solvent in the coating solution for an anti-glare layer, the solvent having a high evaporation rate has an evaporation rate of preferably 150 or more and 500 or less, more preferably 250 or more and 450 or less, further preferably 300 or more and 400 or less. Examples of the solvent having a high evaporation rate include methyl isobutyl ketone having an evaporation rate of 160, and methyl ethyl ketone having an evaporation rate of 370.

In the solvent in the coating solution for an anti-glare layer, the solvent having a low evaporation rate has an evaporation rate of preferably 15 or more and 110 or less, more preferably 30 or more and 100 or less, further preferably 50 or more and 95 or less. Examples of the solvent having a low evaporation rate include cyclopentanone having an evaporation rate of 90, propylene glycol monomethyl ether acetate having an evaporation rate of 44, propylene glycol monomethyl ether propionate having an evaporation rate of 19, and cyclohexanone having an evaporation rate of 32.

In the solvent in the coating solution for an anti-glare layer, the mass ratio between the solvent having a high evaporation rate and the solvent having a low evaporation rate is preferably 50/50 to 90/10, more preferably 60/40 to 80/20.

The content of the solvent in the coating solution for an anti-glare layer is adjusted to a solid content concentration of preferably 30 mass % or more and 70 mass % or less, more preferably 40 mass % or more and 60 mass % or less.

It is preferable to control drying conditions when the coating solution for forming an anti-glare layer is applied and dried.

The drying conditions can be controlled by, for example, the drying temperature, the drying time and the wind speed in a drier. The drying temperature is preferably 50° C. or higher and 120° C. or lower, more preferably 60° C. or higher and 100° C. or lower, further preferably 70° C. or higher and 90° C. or lower. The drying time is preferably 10 seconds or more and 50 seconds or less, more preferably 20 seconds or more and 40 seconds or less. The drying wind speed is preferably 0.2 m/s or more and 50 m/s or less, more preferably 0.5 m/s or more and 30 m/s or less, further preferably 1 m/s or more and 25 m/s or less.

The drying wind is preferably substantially horizontal to the substrate, more preferably substantially horizontal to the substrate and counter to the substrate conveyance direction.

When irradiation with an ionizing radiation is performed in the process of forming an anti-glare layer, it is preferred to perform the irradiation after drying of the coating solution for controlling of the surface shape of the anti-glare layer by drying.

<<Surface Roughness of Anti-Glare Layer>>

The roughness of the surface of the anti-glare layer is preferably in a predetermined range.

For example, the arithmetic average roughness Ra of the anti-glare layer is preferably 0.03 µm or more and 0.20 µm or less, more preferably 0.04 µm or more and 0.09 µm or less, further preferably 0.05 µm or more and 0.07 µm or less.

The surface roughness of the anti-glare layer means the surface roughness of the anti-glare layer on which other layers such as a low refractive index layer are not formed.

The surface roughness of the anti-glare layer is an average value of measurements at 10 points.

Ra of the surface of the anti-glare layer is preferably in the range of 0.03 µm or more and 0.20 µm or less, 0.03 µm or more and 0.09 µm or less, 0.03 µm or more and 0.07 µm or less, 0.04 µm or more and 0.20 µm or less, 0.04 µm or more and 0.09 µm or less, 0.04 µm or more and 0.07 µm or less, 0.05 µm or more and 0.20 µm or less, 0.05 µm or more and 0.09 µm or less, or 0.05 µm or more and 0.07 µm or less.

Ra described in JIS B0601: 1994 is a two-dimensional roughness parameter, and in the present specification, Ra is one obtained by extending the two-dimensional roughness parameter to three dimensions, and is calculated from the following expression (1), where X and Y axes that are orthogonal coordinate axes are placed on a base plane, Z (x, y) is a roughness curve, and Lx and Ly are a size of the base plane. In the following expression (1), A=Lx×Ly. In the present specification, Ra means a value determined with Ly/4 (mm) as a cutoff value. It is to be noted that Lx<Lx.

$$Ra = \frac{1}{A}\int_0^{Lx}\int_0^{Ly}|Z(x,y)|dxdy \quad (1)$$

<Low Refractive Index Layer>

The low refractive index layer is a layer located on a surface of the anti-glare layer on a side opposite to the substrate. It is preferable that the low refractive index layer be arranged so as to form a surface of the anti-glare antireflection member.

The refractive index of the low refractive index layer is preferably 1.10 or more and 1.48 or less, more preferably 1.20 or more and 1.45 or less, more preferably 1.26 or more and 1.40 or less, more preferably 1.28 or more and 1.38 or less, more preferably 1.30 or more and 1.32 or less.

In the present specification, the refractive index refers to a refractive index at a wavelength of 589.3 nm.

The refractive index of the low refractive index layer is preferably in the range of 1.10 or more and 1.48 or less, 1.10 or more and 1.45 or less, 1.10 or more and 1.40 or less, 1.10 or more and 1.38 or less, 1.10 or more and 1.32 or less, 1.20 or more and 1.48 or less, 1.20 or more and 1.45 or less, 1.20 or more and 1.40 or less, 1.20 or more and 1.38 or less, 1.20 or more and 1.32 or less, 1.26 or more and 1.48 or less, 1.26 or more and 1.45 or less, 1.26 or more and 1.40 or less, 1.26 or more and 1.38 or less, 1.26 or more and 1.32 or less, 1.28 or more and 1.48 or less, 1.28 or more and 1.45 or less, 1.28 or more and 1.40 or less, 1.28 or more and 1.38 or less, 1.28 or more and 1.32 or less, 1.30 or more and 1.48 or less, 1.30 or more and 1.45 or less, 1.30 or more and 1.40 or less, 1.30 or more and 1.38 or less, or 1.30 or more and 1.32 or less.

The average of the thickness of the low refractive index layer is preferably 80 nm or more and 130 nm or less, more preferably 85 nm or more and 110 nm or less, more preferably 90 nm or more and 105 nm or less. The average of the thickness of the low refractive index layer is preferably larger than the average particle size of particles contained in the low refractive index layer, such as hollow particles and non-hollow particles.

The average of the thickness of the low refractive index layer is preferably in the range of 80 nm or more and 130 nm or less, 80 nm or more and 110 nm or less, 80 nm or more and 105 nm or less, 85 nm or more and 130 nm or less, 85 nm or more and 110 nm or less, 85 nm or more and 105 nm or less, 90 nm or more and 130 nm or less, 90 nm or more and 110 nm or less, or 90 nm or more and 105 nm or less.

The anti-glare layer and the low refractive index layer may be in contact with each other, or are not required to be in contact with each other, and are preferably in contact with each other. In other words, it is preferable that another layer such as a high refractive index layer is not interposed between the anti-glare layer and the low refractive index layer. With the aforementioned configuration, it is possible to easily suppress coloring in viewing in an oblique direction.

When another layer is interposed between the anti-glare layer and the low refractive index layer, the refractive index of the other layer is preferably in the above-described suitable range of the refractive index of the anti-glare layer.

Methods for forming a low refractive index layer can be broadly classified into wet methods and dry methods. Wet methods are preferable because in dry methods, it is difficult to impart a difference to the thickness of the low refractive index layer.

Examples of the wet method include a method in which a low refractive index layer is formed by a sol-gel method using a metal alkoxide or the like; a method in which a resin having a low refractive index, such as fluororesin, is applied to form a low refractive index layer; and a method in which a coating solution for forming a low refractive index layer, which contains a binder resin composition and low refractive index particles, is applied to form a low refractive index layer. Among them, formation of a low refractive index layer from a coating solution for forming a low refractive index layer in which low refractive index particles are contained in a binder resin composition is preferable.

The low refractive index layer preferably comprises a binder resin and particles. The particles preferably comprise hollow particles and non-hollow particles. That is, the low refractive index layer more preferably comprises a binder resin, hollow particles and non-hollow particles.

<<Hollow Particle and Non-Hollow Particle>>

The material of each of the hollow particle and the non-hollow particle may be either an inorganic compound such as silica or magnesium fluoride, or an organic compound, and is preferably silica for reduction of the refractive index, and strength. Hereinafter, hollow particles and non-hollow particles will be described with a focus on hollow silica particles and non-hollow silica particles.

The hollow silica particle refers to a particle having an outer shell layer composed of silica, where the inner portion of the particle surrounded by the outer shell layer is a cavity, and the inner portion of the cavity contains air. The hollow silica particle contains air, so that the refractive index decreases in proportion to the content ratio of the gas as compared to the refractive index of silica itself. The non-hollow silica particle is a particle in which the inner portion is not a cavity as in the hollow silica particle. The non-hollow silica particle is, for example, a solid silica particle.

The shape of each of the hollow silica particle and the non-hollow silica particle is not particularly limited, and may be a spherical shape, a spheroidal shape, a substantially spherical shape such as a polyhedron shape which can be approximated by a sphere, or the like. In particular, a spherical shape, a spheroidal shape or a substantially spherical shape is preferable from the viewpoint of scratch resistance.

Since hollow silica particles contain air, they play a role of reducing the overall refractive index of the low refractive index layer. By using hollow silica particles having a high ratio of air and having a large particle size, the refractive index of the low refractive index layer can be further reduced. On the other hand, hollow silica particles tend to be poor in mechanical strength. In particular, if hollow silica particles having a high ratio of air and having a large particle size is used, the scratch resistance of the low refractive index layer tends to be easily deteriorated.

Non-hollow silica particles are present preferably on a side opposite to the anti-glare layer in the low refractive index layer, more preferably dispersed overall the low refractive index layer. When the non-hollow silica particles are present in the manner described above, the scratch resistance of the low refractive index layer can be easily improved.

It is preferable to set the average particle size of the hollow silica particles and the average particle size of the non-hollow silica particles so that the hollow silica particles are close together and the non-hollow particles can enter gaps between the hollow silica particles.

Specifically, the ratio of the average particle size of the non-hollow silica particles to the average particle size of the hollow silica particles is preferably 0.29 or less, more preferably 0.27 or less. When the average particle size of non-hollow silica particles/average particle size of hollow silica particles is in the above-described range, the hollow silica particles and the non-hollow silica particles are easily dispersed uniformly in the thickness direction of the low refractive index layer, so that scratch resistance can be easily improved. The average particle size ratio is preferably 0.05 or more, more preferably 0.15 or more.

The average particle size ratio is preferably in the range of 0.05 or more and 0.29 or less, 0.05 or more and 0.27 or less, 0.15 or more and 0.29 or less, or 0.15 or more and 0.27 or less.

From the viewpoint of optical properties and mechanical strength, the average particle size of the hollow silica particles is preferably 20 nm or more and 100 nm or less, more preferably 30 nm or more and 90 nm or less, further preferably 40 nm or more and 80 nm or less.

The average particle size of the hollow silica particles is preferably in the range of 20 nm or more and 100 nm or less, 20 nm or more and 90 nm or less, 20 nm or more and 80 nm or less, 30 nm or more and 100 nm or less, 30 nm or more and 90 nm or less, 30 nm or more and 80 nm or less, 40 nm or more and 100 nm or less, 40 nm or more and 90 nm or less, or 40 nm or more and 80 nm or less.

From the viewpoint of prevention of aggregation of non-hollow silica particles, and dispersibility, the average particle size of the non-hollow silica particles is preferably 0.5 nm or more and smaller than the average particle size of the hollow silica particles. The average particle size of the non-hollow silica particles is preferably 0.5 nm or more and 20 nm or less, more preferably 5 nm or more and 20 nm or less.

The average particle sizes of the hollow silica particles and the non-hollow silica particles can be calculated by, for examples, the following operations (B1) to (B3);

(B1) A cross-section of the anti-glare antireflection member comprising particles is imaged by TEM or STEM, where in TEM or STEM, the accelerating voltage is preferably 10 kv or more and 30 kV or less, and the magnification is preferably 50000 or more and 300000 or less;

(B2) 10 particles are randomly extracted on an observation image, and the particle sizes of the individual particles are calculated, where a cross-section of the particle is sandwiched between arbitrary two parallel straight lines, the two straight lines are combined so as to maximize the distance between the two straight lines, and the distance between the two straight lines is measured as a particle size; and (B3) the observation image of the same sample is subjected to the same operation as above five times on different screens, and a value obtained from the number average for a total of 50 particles is determined as an average particle size of the particles.

It is preferable that the surfaces of the hollow silica particles and the non-hollow silica particles be covered with a silane coupling agent. The silane coupling agent is preferably one having a (meth)acryloyl group or an epoxy group.

When the silica particles are subjected to surface treatment with a silane coupling agent, affinity between the silica particles and the binder resin is improved, so that aggregation of the silica particles is less likely to occur. Accordingly, the dispersion of the silica particles is likely to be uniform. When affinity between the silica particles and the binder resin is improved by a silane coupling agent, resistance at the time when the wet state low refractive index layer formed on the convex portion of the anti-glare layer flows down to the flat portion of the anti-glare layer increases, so that the average of Δd can be easily inhibited from becoming excessively large.

When the content of the hollow silica particles increases, the rate of packing of the hollow particles in the binder resin increases, leading to a decrease in refractive index of the low refractive index layer. When the content of the hollow silica particles increases, the viscosity of the coating solution for a low refractive index layer increases, and thus resistance at the time when the wet state low refractive index layer formed on the convex portion of the anti-glare layer flows down to the flat portion of the anti-glare layer increases, so that the average of Δd can be easily inhibited from becoming excessively large. Thus, the content of the hollow silica particles is preferably 100 parts by mass or more, more preferably 130 parts by mass or more, based on 100 parts by mass of the binder resin.

On the other hand, if the content of the hollow silica particles is excessively large, the mechanical strength, such as scratch resistance, of the low refractive index layer tends to be deteriorated. If the content of the hollow silica particles is excessively large, the viscosity of the coating solution for a low refractive index layer tends to excessively increase, resulting in an excessively small average of Δd. Thus, the content of the hollow silica particles is preferably 300 parts by mass or less, more preferably 200 parts by mass or less, based on 100 parts by mass of the binder resin.

The content of the hollow silica particles based on 100 parts by mass of the binder resin is preferably in the range of 100 parts by mass or more and 300 parts by mass or less, 100 parts by mass or more and 200 parts by mass or less, 130 parts by mass or more and 300 parts by mass or less, or 130 parts by mass or more and 200 parts by mass or less.

If the content of the non-hollow silica particles is small, there may be no influence on an increase in hardness even when the non-hollow silica particles are present on the surface of the low refractive index layer. When the content of the non-hollow silica particles increases, the viscosity of the coating solution for a low refractive index layer increases, and thus resistance at the time when the wet state low refractive index layer formed on the convex portion of the anti-glare layer flows down to the flat portion of the anti-glare layer increases, so that the average of Δd can be easily inhibited from becoming excessively large. When the content of the non-hollow silica particles increases, the influence of shrinkage unevenness caused by polymerization of the binder resin can be reduced to easily adjust the average of Δd. Thus, the content of the non-hollow silica particles is preferably 50 parts by mass or more, more preferably 60 parts by mass or more, based on 100 parts by mass of the binder resin.

On the other hand, if the content of the non-hollow silica particles is excessively large, the viscosity of the coating solution for a low refractive index layer tends to excessively increase, resulting in an excessively small average of Δd. Thus, the content of the non-hollow silica particles is preferably 150 parts by mass or less, more preferably 100 parts by mass or less, based on 100 parts by mass of the binder resin.

The content of the non-hollow silica particles based on 100 parts by mass of the binder resin is preferably in the range of 50 parts by mass or more and 150 parts by mass or less, 50 parts by mass or more and 100 pars by mass or less, 60 parts by mass or more and 150 parts by mass or less, or 60 parts by mass or more and 100 pars by mass or less.

<<Binder Resin>>

The binder resin in the low refractive index layer preferably comprises a cured product of a curable resin composition. Examples of the cured product of the curable resin composition include a cured product of a thermosetting resin composition, and a cured product of an ionizing radiation-curable resin composition, and a cured product of an ionizing radiation-curable resin composition is preferable for further improving mechanical strength.

Examples of the thermosetting resin composition and the ionizing radiation-curable resin composition in the low refractive index layer include resin compositions similar to those exemplified for the anti-glare layer. Among them, an ionizing radiation-curable resin composition is preferable. That is, the binder resin in the low refractive index layer preferably comprises a cured product of an ionizing radiation-curable resin composition.

The ionizing radiation-curable resin composition in the low refractive index layer is preferably a polyfunctional (meth)acrylate-based compound, and a polyfunctional (meth)acrylate oligomer is preferable. That is, the binder resin in the low refractive index layer preferably comprises a cured product of a polyfunctional (meth)acrylate oligomer. The cured product of a polyfunctional (meth)acrylate oligomer is capable of improving the surface hardness of the anti-glare antireflection member, and suppressing excessive cure shrinkage of the low refractive index layer to easily adjust the average of Δd. The polyfunctional (meth)acrylate oligomer is capable of making the viscosity of the coating solution for a low refractive index layer moderately high to easily inhibit the average of Δd becoming excessively high.

The ratio of the cured product of a polyfunctional (meth) acrylate oligomer to the total binder resin in the low refractive index layer is preferably 60 mass % or more, more preferably 80 mass % or more, further preferably 90 mass % or more, still further preferably 100 mass %.

The low refractive index layer may include binder resins other than a cured product of a polyfunctional (meth) acrylate oligomer as long as the effects of the present disclosure are not inhibited.

Examples of the polyfunctional (meth)acrylate-based oligomer include (meth)acrylate-based polymers such as urethane (meth)acrylate, epoxy (meth)acrylate, polyester (meth)acrylate and polyether (meth)acrylate.

The oligomer as a polyfunctional (meth)acrylate-based compound has a weight average molecular weight of preferably 500 or more and 5000 or less, more preferably 1000 or more and 3000 or less.

When the weight average molecular weight of the oligomer is 500 or more, excessive cure shrinkage of the low refractive index layer can be suppressed to easily adjust the average of Δd. When the weight average molecular weight of the oligomer is in the above-described range, the viscosity or the coating solution for a low refractive index layer can be easily adjusted to a level that is not either excessively high or excessively low, and the average of Δd can be easily set to 7.0 nm or more and 40.0 nm or less.

The weight average molecular weight of the oligomer as the polyfunctional (meth)acrylate-based compound is preferably in the range of 500 or more and 5000 or less, 500 or more and 3000 or less, 1000 or more and 5000 or less, or 1000 or more and 3000 or less.

The binder resin of the low refractive index layer preferably comprises components identical to those of the binder resin in the anti-glare layer. With the aforementioned configuration, affinity between the anti-glare layer and the low refractive index layer is enhanced, and thus resistance at the time when the wet state low refractive index layer formed on the convex portion of the anti-glare layer flows down to the flat portion of the anti-glare layer increases, so that the average of Δd can be easily inhibited from becoming excessively large.

The ratio of components identical to those of the binder resin in the anti-glare layer to the total amount of the binder resin in the low refractive index layer is preferably 30 mass % or more, more preferably 50 mass % or more, further preferably 70 mass % or more, still further preferably 90 mass % or more.

The low refractive index layer may comprise a leveling agent such as fluorine-based leveling agent, a silicone-based leveling agent or a fluorine/silicone-based leveling agent.

The content of the leveling agent based on 100 parts by mass of the binder resin is preferably 0.1 parts by mass or more and 10 parts by mass or less, more preferably 0.2 parts by mass or more and 5 parts by mass or less, further preferably 0.3 parts by mass or more and 3 parts by mass or less.

The content of the leveling agent based on 100 parts by mass of the binder resin is preferably in the range of 0.1 parts by mass or more and 10 parts by mass or less, 0.1 parts by mass or more and 5 parts by mass or less, 0.1 parts by mass or more and 3 parts by mass or less, 0.2 parts by mass or more and 10 parts by mass or less, 0.2 parts by mass or more and 5 parts by mass or less, 0.2 parts by mass or more and 3 parts by mass or less, 0.3 parts by mass or more and 10 parts by mass or less, 0.3 parts by mass or more and 5 parts by mass or less, or 0.3 parts by mass or more and 3 parts by mass or less.

When the ionizing radiation-curable compound for forming the binder resin in the low refractive index layer is an ultraviolet ray-curable compound, the ionizing radiation-curable composition preferably comprises additives such as a photopolymerization initiator and a photopolymerization accelerator.

Examples of the photopolymerization initiator include one or more selected from the group consisting of acetophenone, benzophenone, an α-hydroxyalkylphenone, Michler's ketone, benzoin, benzilidimethylketal, benzoyl benzoate, an α-acyloxime ester, anthraquinone, halogenoketone, thioxanthone, and the like. Among them, an α-hydroxyalkylphenone is preferable.

The photopolymerization accelerator may enhance the curing rate through the reduction of polymerization inhibition due to the air on curing, and examples thereof include one or more selected from isoamyl p-dimethylaminobenzoate and ethyl p-dimethylaminobenzoate.

The low refractive index layer may comprise other additives as long as the effects of the present disclosure are not inhibited. Examples of the additives include an ultraviolet ray absorbent, an antioxidant, and a light stabilizer.

<<Solvent>>

For the coating solution for a low refractive index layer, a solvent is typically used for adjusting the viscosity, and enabling the components to be dissolved or dispersed.

Examples of the solvent in the coating solution for a low refractive index layer include solvents similar to those exemplified as solvents for the coating solution for an anti-glare layer.

If the time required for drying the solvent in the coating solution for a low refractive index layer is excessively long, the wet state low refractive index layer formed on the convex portion of the anti-glare layer may excessively flow down to the flat portion of the anti-glare layer, resulting in an excessively large average of Δd. If the time required for drying the solvent in the coating solution for a low refractive index layer is excessively short, an insufficient amount of the wet state low refractive index layer formed on the convex portion of the anti-glare layer may flow down to the flat portion of the anti-glare layer, resulting in an excessively small average of Δd. Thus, it is preferable that a solvent having a high evaporation rate and a solvent having a low evaporation rate be mixed, and used as the solvent in the coating solution for a low refractive index layer.

In the solvent in the coating solution for a low refractive index layer, the solvent having a high evaporation rate has an evaporation rate of preferably 125 or more and 300 or less, more preferably 130 or more and 250 or less, further preferably 140 or more and 200 or less. Examples of the solvent having a high evaporation rate include methyl isobutyl ketone having an evaporation rate of 160.

In the solvent in the coating solution for a low refractive index layer, the solvent having a low evaporation rate has an evaporation rate of preferably 20 or more and 90 or less, more preferably 25 or more and 80 or less, further preferably 30 or more and 60 or less. Examples of the solvent having a low evaporation rate include propylene glycol monomethyl ether acetate having an evaporation rate of 44.

In the solvent in the coating solution for a low refractive index layer, the mass ratio between the solvent having a high evaporation rate and the solvent having a low evaporation rate is preferably 50/50 to 90/10, more preferably 60/40 to 80/20.

The content of the solvent in the coating solution for a low refractive index layer is adjusted to a solid content concentration of preferably 1 mass % or more and 10 mass % or less, more preferably 3 mass % or more and 7 mass % or less.

It is preferable to control drying conditions when the coating solution for a low refractive index layer is applied and dried.

The drying conditions can be controlled by, for example, the drying temperature, the drying time and the wind speed in a drier. The drying temperature is preferably 40° C. or higher and 100° C. or lower, more preferably 45° C. or higher and 80° C. or lower, further preferably 50° C. or higher and 70° C. or lower. The drying time is preferably 10 seconds or more and 50 seconds or less, more preferably 20 seconds or more and 40 seconds or less. The drying wind speed is preferably 0.2 m/s or more and 50 m/s or less, more preferably 0.5 m/s or more and 30 m/s or less, further preferably 1 m/s or more and 25 m/s or less.

The drying wind is preferably substantially horizontal to the substrate, more preferably substantially horizontal to the substrate and counter to the substrate conveyance direction. On the other hand, if the direction of the drying wind is vertical to the substrate, there is a tendency that an excessive proportion of the wet state low refractive index layer formed on the convex portion of the anti-glare layer is likely to flow down to the flat portion of the anti-glare layer, resulting in an excessively large average of Δd.

When irradiation with an ionizing radiation is performed in the process of forming the low refractive index layer, it is preferred to perform the irradiation after drying of the coating solution for securing the fluidity of the wet state low refractive index layer.

Further, for easily setting the average of Δd to 7.0 nm or more and 40.0 nm or less, it is preferable to provide a step of performing heating from the substrate side after formation of the anti-glare layer on the substrate is completed and before formation of the low refractive index layer is completed.

If the time for drying the solvent contained in the wet state low refractive index layer is excessively long, the average of Δd may be excessively large. The solvent drying rate can be adjusted by the solvent type and drying conditions. However, the solvent type may be limited in consideration of environmental loads, adhesion to the anti-glare layer, solubility of the binder resin of the low refractive index layer, and the like. The drying conditions may be limited in consideration of the heat resistance of the substrate, and the like. Accordingly, it is preferable to adjust the drying time by means other than the solvent type and drying conditions.

Examples of other means include the above-described step of performing heating from the substrate side. When the step is provided, the temperature of a surface of the anti-glare layer to which the coating solution for a low refractive index layer is applied rises, so that it is possible to shorten the time for drying the coating solution for a low refractive index layer. Examples of the means for performing heating from the substrate side include means for heating rolls such as a conveyance roll and a pressure roll. Here, the substrate temperature is preferably 30° C. or higher and 55° C. or lower, more preferably 35° C. or higher and 50° C. or lower. The substrate temperature is preferably in the above-described temperature at the time of applying the coating solution for a low refractive index layer. It is preferable that the substrate temperature and the temperature of the drying wind satisfy the relationship of "substrate temperature<temperature of drying wind".

<<Thickness Difference>>

In the anti-glare antireflection member of the present disclosure, the average of $\Delta d$ is required to be 7.0 nm or more and 40.0 nm or less, where $\Delta d$ is a thickness difference of the low refractive index layer in an arbitrary 2 mm×2 mm region of the anti-glare antireflection member. $\Delta d$ means a thickness difference of the low refractive index layer of the completed anti-glare antireflection member as described above. Hereinafter, the technical meaning of the average of $\Delta d$ will be described.

Normally, the thickness of the low refractive index layer is designed to reduce the reflectance in a frontal direction at a wavelength of 550 nm where the luminosity is high for humans. However, in an oblique direction, the distance over which light passes through the low refractive index layer increases, so that the thickness substantially increases. Accordingly, in a normal low refractive index layer designed to reduce the reflectance in a front direction at a wavelength of 550 nm, the reflectance in an oblique direction cannot be reduced. In particular, in a normally designed low refractive index layer, the reflectance of light in a red wavelength region which has a long wavelength is extremely high. Accordingly, in a normally designed low refractive index layer, coloring in viewing in an oblique direction cannot be suppressed.

In the present disclosure, by imparting a thickness difference to the low refractive index layer with the average of $\Delta d$ set to 7.0 nm or more, the influence of substantially increasing the thickness of the low refractive index layer in an oblique direction is suppressed, so that it is possible to suppress coloring in viewing in an oblique direction. Being taken as an average of the thickness of a macroscopic region having at least a size enabling a person to recognize the region is important rather than being taken as the thickness of a microscopic region. When the average of the thickness of a macroscopic region having at least a size enabling a person to recognize the region is 7.0 nm or more as an average of $\Delta d$, the increase rate in an oblique direction can be suppressed. Thus, when the average of $\Delta d$ is 7.0 nm or more, coloring in viewing in an oblique direction can be suppressed.

The average of $\Delta d$ is preferably 10.0 nm or more, more preferably 15.0 nm or more, further preferably 20.0 nm or more.

However, if the average of $\Delta d$ is excessively large, visual recognition as luminescent spots occurs because there is a local difference in reflectance. In the present disclosure, by suppressing the thickness difference of the low refractive index layer with the average of $\Delta d$ set to 40.0 nm or less, visual recognition of luminescent spots is suppressed. The average of $\Delta d$ is preferably 35.0 nm or less, more preferably 33.0 nm or less, further preferably 30.0 nm or less.

The average of $\Delta d$ is preferably in the range of 7.0 nm or more and 35.0 nm or less, 7.0 nm or more and 33.0 nm or less, 7.0 nm or more and 30.0 nm or less, 10.0 nm or more and 40.0 nm or less, 10.0 nm or more and 35.0 nm or less, 10.0 nm or more and 33.0 nm or less, 10.0 nm or more and 30.0 nm or less, 15.0 nm or more and 40.0 nm or less, 15.0 nm or more and 35.0 nm or less, 15.0 nm or more and 33.0 nm or less, 15.0 nm or more and 30.0 nm or less, 20.0 nm or more and 40.0 nm or less, 20.0 nm or more and 35.0 nm or less, 20.0 nm or more and 33.0 nm or less, or 20.0 nm or more and 30.0 nm or less.

The reason why the size of the $\Delta d$ measurement region is set to 2 mm×2 mm is that the area is unlikely to extend beyond a reflectance measurement spot and that the size enables a person to sufficiently recognize the region.

For the reflectance measurement spot, the size of a measurement spot at an incidence angle of 5 degrees is 50.2 mm$^2$ and the size of a measurement spot at an incidence angle of 60 degrees is 100.0 mm$^2$ in Examples described later. The reason why the size of the measurement spot varies depending on the angle is that light made to pass through a mask having a predetermined size is projected to an inclined sample to perform measurement. As the mask, a mask having a size of 5 mm×10 mm is used in Examples described later.

$\Delta d$ representing a thickness difference of the low refractive index layer in an arbitrary 2 mm×2 mm region can be measured in accordance with, for example, the following z1 to z10.

(z1) The anti-glare antireflection member is cut to a width of 2 mm to prepare a strip-shaped sample A1. Hereinafter, the direction along the 2 mm-width of the sample A1 is referred to as a short-side direction and the direction orthogonal to the short-side direction is referred to as a long-side direction. Sampling may be performed with a margin in the short-side direction in consideration of the possibility that the vicinity of the cut surface of the sample A1 is disordered. That is, the region observed has a size of 2 mm, the size of the sample A1 in the short-side direction may be 3 mm or more and 4 mm or less.

Alternatively, a sample A1 may be obtained by bonding a surface of the anti-glare antireflection member on the substrate side to a plastic plate to prepare a laminate, and cutting the laminate in the manner described above.

(z2) The shape of a surface of the sample A1 on the low refractive index layer side is measured by a white interference surface shape measurement device. The measurement region is a 2 mm×2 mm region extending over 2 mm from an end portion of the sample A1 in the short-side direction. In consideration of the possibility that the vicinity of end portions of the sample A1 in the short-side and long-side directions, a measurement region may be set with the exclusion of the vicinity of the end portions, or a 3 mm×3 mm region including the vicinity of the end portions may be measured, followed by selection of a 2 mm×2 mm region from the measured region.

(z3) Height profiles in the short-side direction are acquired at four points 400 nm, 800 nm, 1200 nm and 1600 nm away from the end portion of the measurement region in the short-side direction.

For example, FIG. 3 is a plan view of the sample A1, where the bold line area represents a 2 mm×2 mm measurement region, and four broken lines i, ii, iii and iv correspond to the four points in the short-side direction at which the height profiles are acquired.

(z4) For each of the four height profiles, a peak point that is a point at which the height profile has the highest elevation, and a point at which the height profile has the lowest elevation are identified, and a distance L1 between the end portion of the sample A1 in the long-side direction and the peak point and a distance L2 between the end portion of the sample A1 in the long-side direction and the bottom portion are identified. In the present specification, the "point at which the height profile has the lowest elevation" is sometimes referred to as a "bottom portion".

(z5) The sample A1 is embedded with a resin to prepare an embedded sample B1.

(z6) The embedded sample B1 is cut in a direction parallel to the short-side direction of the sample A1 to expose a vertical cross-section of the sample A1 at a point 400 nm away from the end portion of the measurement region of the sample A1 in the short-side direction.

(z7) The vertical cross-section is observed with a scanning transmission electron microscope to calculate dmin representing a thickness of the low refractive index layer at a point corresponding to the peak point and dmax representing a thickness of the low refractive index layer at a point corresponding to the bottom portion are calculated.

(z8) From a difference between dmax and dmin, d-i representing a thickness difference at a point 400 nm away from the end portion of the measurement region in the short-side direction is calculated.

(z9) The embedded sample B1 is cut in a direction parallel to the short-side direction of the sample A1 to expose vertical cross-sections of the sample A1 at points 800 nm, 1200 nm and 1600 nm away from the end portion of the measurement region of the sample A1 in the short-side direction, and the same operations as in z7 and z8 are carried out. Through the operations, d-ii, d-iii and d-iv representing thickness differences, respectively, at points 800 nm, 1200 nm and 1600 nm away from the end portion of the measurement region in the short-side direction are calculated.

(z10) Δd representing a thickness difference of the low refractive index layer in an arbitrary 2 mm×2 mm region can be calculated by averaging d-i, d-ii, d-iii and d-iv.

The embedded sample can be obtained by, for example, arranging a strip-shaped sample in a silicon embedment plate, then pouring an embedding resin, and curing the embedding resin, followed by taking out a cut sample and the embedding resin covering the cut sample from the silicon embedment plate. In the case of an epoxy resin manufactured by Struers Company as exemplified below, it is preferable that the aforementioned curing step be carried out by leaving the sample standing at normal temperature for 12 hours to perform curing.

Examples of the silicon embedment plate include a silicon embedment plate manufactured by Dosaka EM Co., Ltd. The silicon embedment plate is sometimes referred to as a silicon capsule. As the embedding epoxy resin, for example, one obtained by mixing trade name "EPOFIX" manufactured by Struers Company and trade name "Curing Agent for EPOFIX" manufactured by Struers Company at 10:1.2 can be used.

It is preferable to cut the embedded sample with a diamond knife.

Examples of the apparatus for cutting the embedded sample include "ULTRAMICROTOME EM UC7" manufactured by Leica Microsystems Company.

The "average of Δd" can be obtained by determining Δd representing a thickness difference of the low refractive index layer in a 2 mm×2 mm region at 10 points of the anti-glare antireflection member, and calculating an average value of Δds of the 10 points.

Among the 10 points at which Δd is determined, the number of points at which the absolute value of Δd is 7.0 nm or more and 40.0 nm or less is preferably 8 or more, more preferably 9 or more, further preferably 10.

<Physical Properties>

The anti-glare antireflection member has a luminous reflectance Y value of preferably 3.0% or less, more preferably 2.0% or less, further preferably 1.5% or less, as measured at an incident angle of light of 5 degrees from the side of the low refractive index layer provided.

The anti-glare antireflection member of the present disclosure imparts a difference to the thickness of the low refractive index layer, and therefore has a limited reflectance. Thus, the lower value of the luminous reflectance Y value is preferably 0.5% or more, more preferably 0.8% or more, further preferably 1.0% or more.

In the present specification, the luminous reflectance Y value refers to the luminous reflectance Y value of the CIE 1931 standard colorimetric system. The luminous reflectance Y value can be calculated with a spectral photometer. Examples of the spectral photometer include trade name "UV-3600 plus" manufactured by Shimadzu Corporation. It is preferable to bond a black plate to the back surface of the substrate in measurement of the luminous reflectance.

Each of the luminous reflectance Y value, the total light transmittance and the haze is an average value of measurements of 10 points.

The anti-glare antireflection member has a total light transmittance of preferably 50% or more, more preferably 80% or more, further preferably 90% or more, as determined according to JIS K7361-1: 1997.

The total light transmittance and the haze described later are measured with the light incidence surface on the substrate side. The total light transmittance and the haze described later can be measured with, for example, a haze meter (product number: HM-150) manufactured by Murakami Color Research Laboratory Co., Ltd.

In applications requiring transparency, the anti-glare antireflection member has a haze of preferably 0.3% or more and 10% or less, more preferably 0.4% or more and 7% or less, more preferably 0.5% or more and 5% or less, more preferably 0.6% or more and 2.2% or less, as determined according to JIS K7136: 2000.

In applications requiring higher glare-proofness, the anti-glare antireflection member has a haze of preferably 1% or more and 90% or less, more preferably 10% or more and 85% or less, further preferably 20% or more and 80% or less.

A surface of the anti-glare antireflection member on the low refractive index layer side has an arithmetic average roughness Ra of preferably 0.01 µm or more and 0.18 µm or less, more preferably 0.02 µm or more and 0.08 µm or less, further preferably 0.03 µm or more and 0.07 µm or less.

The surface roughness on the low refractive index layer side is an average value of measurements at 10 points.

Ra of the surface on the low refractive index layer side is preferably in the range of 0.01 µm or more and 0.18 µm or less, 0.01 µm or more and 0.08 µm or less, 0.01 µm or more and 0.07 µm or less, 0.02 µm or more and 0.18 µm or less, 0.02 µm or more and 0.08 µm or less, 0.02 µm or more and 0.07 µm or less, 0.03 µm or more and 0.18 µm or less, 0.03 µm or more and 0.08 µm or less, or 0.03 µm or more and 0.07 µm or less.

When various physical properties such as thickness, optical properties and surface roughness are measured, values are obtained by performing the measurement at a temperature of 23±5° C. and a relative humidity of 40% or more and 65% or less unless particularly specified in the present specification. Before the start of each measurement and evaluation, a sample of interest is exposed to the above-described atmosphere for 30 minutes or more, and then measured and evaluated.

<Size, Shape, etc.>

The anti-glare antireflection member may be in the form of a single sheet cut to a predetermined size, or may be in the form of a roll obtained by winding a long sheet to a roll. The size of the single sheet is not particularly limited, and the maximum size is about 2 inches or more and 500 inches or less. The "maximum size" refers to the maximum length in connecting of arbitrary two points of the anti-glare antireflection member. For example, when the anti-glare antireflection member has a rectangular shape, the diagonal line of the rectangular shape corresponds to the maximum size. When the anti-glare antireflection member has a circular shape, the diameter of the circle corresponds to the maximum size.

The width and the length of the roll are not particularly limited, and in general, the width is 500 mm or more and 8000 mm or less and the length is 100 m or more and 10000 m or less. The anti-glare antireflection member in the form of a roll can be cut to a single sheet shape tailored to the size of an image display device or the like. An end portion of the roll, where physical properties are not stable, is preferably excluded in the cutting.

The shape of the single sheet is also not particularly limited, and may be, for example, a polygonal shape such as a triangular shape, a quadrangular shape or a pentagonal shape, or a circular shape, or may be a randomly irregular shape. More specifically, when the anti-glare antireflection member has a quadrangular shape, the aspect ratio is not particularly limited as long as it is not problematic in terms of a display screen. For example, width:length=1:1, 4:3, 16:10, 16:9, 2:1, 5:4, or 11:8.

[Method for Selecting Anti-Glare Antireflection Member]

The method for selecting an anti-glare antireflection member according to the present disclosure comprises the following steps (1) and (2):

(1) measuring a thickness difference Δd of a low refractive index layer in an arbitrary 2 mm×2 mm region of an anti-glare antireflection member comprising an anti-glare layer and the low refractive index layer on a substrate, and calculating an average of Δd; and
(2) selecting an anti-glare antireflection member satisfying a requirement that the average of Δd be 7.0 nm or more and 40.0 nm or less.

It is preferable that the method for selecting an anti-glare antireflection member further comprise, as additional requirements, one or more requirements selected from the group consisting of those of preferred embodiments of the anti-glare antireflection member of the present disclosure.

Examples of the additional requirement include a requirement that the haze as determined according to JIS K7136: 2000 be 0.3% or more and 10% or less.

The method for selecting an anti-glare antireflection member according to the present disclosure enables stable selection of an anti-glare antireflection member capable of suppressing coloring in viewing in an oblique direction and suppressing visual recognition of local luminescent spots.

[Polarizing Plate]

The polarizing plate of the present disclosure is a polarizing plate comprising a polarizer, a first transparent protection plate arranged on one side of the polarizer, and a second transparent protection plate arranged on the other side of the polarizer, wherein at least one selected from the group consisting of the first transparent protection plate and the second transparent protection plate is the anti-glare antireflection member of the present disclosure, and the anti-glare antireflection member is arranged so that the surface on the low refractive index layer side faces the opposite side of the polarizer.

<Polarizer>

Examples of the polarizer include a sheet-type polarizer such as a polyvinyl alcohol film, a polyvinyl formal film, a polyvinyl acetal film, and an ethylene-vinyl acetate copolymer-based saponified film which are dyed with iodine or the like and are stretched, a wire grid-type polarizer formed from a large number of metal wires arranged in parallel, a coating-type polarizer coated with a lyotropic liquid crystal or a dichroic guest-host material, and a multilayer thin film-type polarizer. Such a polarizer may be a reflection-type polarizer having a function of reflecting a non-transmission polarizing component.

<Transparent Protection Plate>

The first transparent protection plate is arranged on one side of the polarizer, and the second transparent protection plate is arranged on the other side. At least one selected from the group consisting of the first transparent protection plate and the second transparent protection plate is the anti-glare antireflection member of the present disclosure.

Examples of the first transparent protection plate and the second transparent protection plate other than the anti-glare antireflection member include a plastic film, and glass. Examples of the plastic film include a polyester film, a polycarbonate film, a cycloolefin polymer film, and an acrylic film, and for improving mechanical strength, a film obtained by stretching any of the aforementioned films is preferable. Examples of the glass include alkali glass, nitride glass, soda-lime glass, borosilicate glass, and lead glass. It is preferable that the glass as a transparent protection plate for protecting the polarizer also serve as another member of the image display device. For example, it is preferable to serve as both the glass substrate of a liquid crystal display element and the transparent protection plate for protecting the polarizer.

It is preferable to bond the polarizer and the transparent protection plate to each other with an adhesive interposed therebetween. As the adhesive, a common adhesive can be used, and a PVA-based adhesive is preferable.

In the polarizing plate of the present disclosure, both the first transparent protection plate and the second transparent protection plate may be the anti-glare film of the present disclosure, and it is preferable that one of the first transparent protection plate and the second transparent protection plate be the anti-glare film of the present disclosure. When the polarizing plate of the present disclosure is used as a polarizing plate arranged on a light emission surface of the display element, it is preferable that the transparent protection plate on a light emission surface of the polarizer be the anti-glare film of the present disclosure. On the other hand, when the polarizing plate of the present disclosure is used as a polarizing plate arranged on a side opposite to the light emission surface of the display element, it is preferable that the transparent protection plate on a side opposite to the light emission surface of the polarizer be the anti-glare film of the present disclosure.

[Surface Plate for Image Display Device]

The surface plate for an image display device according to the present disclosure is a surface plate for an image display device in which an anti-glare antireflection member is bonded on a resin plate or a glass plate, wherein the anti-glare antireflection member is the anti-glare antireflection member of the present disclosure, and the anti-glare antireflection member is arranged so that the surface on the low refractive index layer side faces the opposite side of the resin plate or the glass plate.

The surface plate for an image display device is preferably arranged such that a surface on the bonded anti-glare antireflection member side faces the surface side. In other words, the surface plate for an image display device is preferably arranged such that a surface on the bonded anti-glare antireflection member side faces opposite to the display element.

As the resin plate or the glass plate, a resin plate or a glass plate commonly used as a surface plate of an image display device can be used.

The thickness of the resin plate or the glass plate is preferably 10 μm or more for enhancing the strength. The upper limit of the thickness of the resin plate or the glass plate is typically 5000 μm or less, and is preferably 1000 μm or less, more preferably 500 μm or less, further preferably 100 μm or less because it has been preferred to thin an image display device in recent years. The glass plate includes so called "ultrathin glass". Ultrathin glass is sold by, for example, Samsung Electronics Co., Ltd. and Nippon Electric Glass Co., Ltd.

[Image Display Device]

The image display device is an image display device including the anti-glare antireflection member of the present disclosure arranged on a display element such that the low refractive index layer side faces the opposite side of the display element, and the anti-glare antireflection member is arranged on a surface of the image display device.

Examples of the display element include a liquid crystal display element, an EL display element such as an organic EL display element and an inorganic EL display element, a plasma display element, and a LED display element such as a micro LED display element and a mini LED display element. These display elements may have a touch panel function in the display element.

Examples of the liquid crystal display mode of the liquid crystal display element include IPS mode, VA mode, multi-domain mode, OCB mode, STN mode, and TSTN mode. When the display element is a liquid crystal display element, a backlight is required. The backlight is arranged on a side opposite to a side of the display element having the anti-glare film. Examples of the backlight include a backlight using quantum dots, and a backlight using white light emitting diode.

The image display device may be a foldable image display device or a rollable image display device. The image display device may have a curved shape. The image display device may be an image display device with a touch panel.

EXAMPLES

Hereinafter, the present disclosure will be described in detail by showing Examples and Comparative Examples. The present disclosure is not limited to forms described in Examples.

1. Evaluation and Measurement

The anti-glare antireflection members obtained in Examples and Comparative Examples were measured and evaluated in the following manners. Table 2 shows the results. Unless particularly specified, the atmosphere in each measurement and evaluation was at a temperature of 23±5° C. and a relative humidity of 40% or more and 65% or less, and a specimen of interest was exposed to the atmosphere for 30 minutes or more before the start of each measurement and evaluation, and then subjected to measurement and evaluation.

1-1. Average of $\Delta d$ 10 strip-shaped samples A1 were prepared by cutting the anti-glare antireflection member to a size of a little bit longer than 2 mm×10 mm. Subsequently, in the manner described in steps z2 to z10 in the text of the specification, $\Delta d$ representing a thickness difference of a low refractive index layer in a 2 mm×2 mm region for each of the 10 samples A1 was calculated, and the average value thereof was defined as an average of $\Delta d$. Table 2 shows the results. Table 2 also shows the average of thicknesses at peak points and the average of thicknesses at bottom portions in the 10 samples A1. In Table 2, the "peak portion" represents an average of thicknesses at peak points, and the "bottom portion" represents an average of thicknesses at bottom portions.

For measurement of the surface shape in step z2, measurement and analysis were performed under the following conditions using a white interference microscope (New View 6300 from Zygo Corporation).

For the measurement, Microscope Application of MetroPro ver 8.1.5 was used. For the analysis, Microscope Application of MetroPro ver 8.1.5 and Advanced Texture Application were used.

<Measurement Conditions>
Objective lens: ×2.5
Image Zoom: ×2.5
[Measurement Controls]
Acquisition Mode: Scan
Camera Mode: 992×992 50 Hz
Subtract Sys Err: Off
AGC: On
Phase Res: High
Connection Order: Location
Discon Action: Filter
Min Mod (%): 0.001
Min Area Size: 7
Remove Fringes: On
Number of Averages: 0
FDA Noise Threshold: 10
Scan length: 15 um bipolar
Extended Scan Length: 1000 μm
FDA Res: High
Camera resolution (interval per point): 2.215 μm
Measurement region: 2175. 3 μm×2175.3 μm
[Surface Map Controls]
Removed: None
Sphere Radius: 0 nm
Trim: 0
Trim Mode: All
Data Fill: On
Data Fill Max: 500
Filter: Off
FilterType: Gauss Spline
Filter Low Wavelen: 1100 μm
Filter High Wavelen: 200 μm
Filter Low Freq: 0.90909 1/mm
Filter High Freq: 5.00000 1/mm For cutting the embedded sample in step z7, trade name "ULTRAMICROTOME EM UC7" manufactured by Leica Microsystems Company was used. As a knife, product number "ULTRA 45°" from DiATOME Company was used, and as a mesh, a collodion membrane-attached mesh "product number: 150 MESH Cu" from Nisshin EM Company was used.

As the scanning transmission electron microscope (STEM) in step z8, product number "SU-8000" manufactured by Hitachi High-Tech Corporation was used, and the observation conditions of STEM were as follows.
<Observation Conditions of STEM>
Detector: TE
Accelerating voltage: 30 kV
Emission: 10 µA
Probe current: Normal
Condenser lens 1: 5.0

1-2. Luminous Reflectance Y Value (Reflectance)

A sample was prepared by bonding black plate (trade name: Comoglas DFA2CG 502K (black) type manufactured by Kraray Co., Ltd., thickness 2 mm) to a substrate of each of the anti-glare antireflection members of Examples and Comparative Examples with a 25 µm-thick transparent pressure sensitive adhesive layer (trade name: Panaclean PD-S1 manufactured by Panac Co., Ltd.) interposed therebetween. The size of the sample was 5 cm×5 cm.

Light was incident to the sample in a direction of 5 degrees, where a direction vertical to the surface of the low refractive index layer of the anti-glare antireflection member is 0 degree. As a reflectance of the sample, the luminous reflectance Y value was measured on the basis of regular reflection of the incident light.

For the reflectance, the luminous reflectance Y value was measured as a value representing a luminous reflectance obtained by performing measurement by use of a spectral reflectometer (trade name: V-7100 manufactured by JASCO Corporation) in conditions of a viewing angle of 2 degrees, a C light source, and a wavelength range of from 380 to 780 nm, and thereafter performing calculation by software (JASCO Spectrum Manager Ver 2.0) for conversion into brightness sensed by human eyes. The measurement was performed at 10 points in the sample, and the average value of the 10 points was defined as a reflectance in each of Examples and Comparative Examples. During the measurement, a mask having a size of 5 mm×10 mm was used. Accordingly, the size of the spot for measurement of the reflectance at an incidence angle of 5 degrees is 50.2 mm$^2$. A sample having a reflectance of 1.5% or less was rated "A", and a sample having a reflectance of more than 1.5% and 2.0% or less was rated "B".

1-3. Coloring in Oblique Direction

To each of the samples prepared in 1-2, light was incident in a direction of 60 degrees with a spectral reflectometer identical to that in 1-2, and the wavelength spectral reflectance of the sample in a wavelength range of 380 nm or more and 780 nm or less was measured on the basis of regular reflection of the incident light. The measurement conditions were set to a viewing angle of 2 degrees and a C light source. During the measurement, a mask having a size of 5 mm×10 mm was used. Accordingly, the size of the spot for measurement of the reflectance at an incidence angle of 60 degrees is 100.0 mm$^2$.

Each of "reflectance at red central wavelength (700 nm)/bottom reflectance", "reflectance at green central wavelength (550 nm)/bottom reflectance" and "reflectance at blue central wavelength (450 nm)/bottom reflectance" was calculated, where the bottom reflectance is a minimum value of the spectral reflectance in the above-described range. Further, the total value thereof was calculated.

Coloring in an oblique direction is suppressed as the total value becomes closer to 3. A total value of 3.530 or less corresponds to an acceptable level. A sample having a total value of more than 3.530 was rated "C", a sample having a total value of more than 3.500 and 3.530 or less was rated "B", and a sample having a total value of 3.500 or less was rated "A".

1-4. Luminescent Spot

Each of the samples prepared in 1-2 was placed on a horizontal table with the low refractive index layer side facing upward, and in a well-lighted room environment, whether luminescent spots were present or not was visually evaluated from various angles at which reflected light of a fluorescent lamp as an illumination was observed. The condition of the well-lighted room environment was set to an illumination intensity of 500 lux or more and 1000 lux or less on the low refractive index layer of the sample. For the illumination, a Hf 32 type linear three band sunshine color fluorescent lamp was used. The location of the illumination was 2 m above the horizontal table in a vertical direction. The evaluation was performed at about 50 cm above the sample in straight-line distance. Further, in the well-lighted room environment, whether luminescent spots were present or not was visually evaluated from various angles while the sample was held by a hand and a distance of 20 cm or more and 30 cm or less was kept between the sample and the face.

A total of 20 subjects with 5 subjects in each of the age groups of twenties to fifties performed evaluation by assigning score 3 when not annoyed by luminescent spots, score 2 when unable to make a judgement, and score 1 when annoyed by luminescent spots. An average score of the evaluation by the 20 subjects was calculated, and the sample was ranked on the basis of the following criteria.
<Criteria>
A: The average score is 2.5 or more.
B: The average score is 2.0 or more and less than 2.5.
C: The average score is less than 2.0.

1-5. Glare-Proofness (AG)

Each of the samples prepared in 1-2 was placed on a horizontal table with the low refractive index layer side facing upward. At about 50 cm above the sample in straight-line distance in a well-lighted room environment, a total of 20 subjects with 5 subjects in each of the age groups of twenties to fifties visually evaluated whether or not glare-proofness was obtained which ensured that reflection of the subjects themselves were not annoying. The condition of the well-lighted room environment was set to an illumination intensity of 500 lux or more and 1000 lux or less on the low refractive index layer of the sample. For the illumination, a Hf 32 type linear three band sunshine color fluorescent lamp was used. The location of the illumination was 2 m above the horizontal table in a vertical direction. Further, a sample having a configuration identical to the sample prepared in 1-2 and having a size as large as the A4 size was prepared. Using the A4-size sample, glare-proofness was evaluated in the same manner as described above. The glare-proofness was evaluated on the basis of the following criteria.
<Criteria>
A: The number of subjects assigning a good mark is 14 or more.
B: The number of subjects assigning a good mark is 7 or more and 13 or less.
C: The number of subjects assigning a good mark is 6 or less.

1-6. Total Light Transmittance (Tt) and Haze (Hz)

The total light transmittance as determined according to JIS K7361-1: 1997 and the haze as determined according to JIS K7136: 2000, of the anti-glare antireflection member of each of Examples and Comparative Examples were measured by use of a haze meter (HM-150 manufactured by Murakami Color Research Laboratory Co., Ltd.). The light incidence surface was on the substrate side.

A sample having a total light transmittance of 90% or more was rated "A", and a sample having a total light transmittance of less than 90% was rated "B".

A sample having a haze of 2.2% or less was rated "A", a sample having a haze of more than 2.2% and 5.0% or less was rated "B", and a sample having a haze of more than 5.0% was rated "C".

1-7. Tensile Elastic Modulus and Water-Vapor Transmission Rate of Substrate

In the manner described in the text of the specification, the tensile elastic modulus and the water-vapor transmission rate of the substrate were measured. A substrate having a tensile elastic modulus of 3.5 GPa or more was rated "A", and a substrate having a tensile elastic modulus of 2.5 GPa or more and less than 3.5 GPa was rated "B". A substrate having a water-vapor transmission rate of 100 g/m$^2$/day or less was rated "A", and a substrate having a water-vapor transmission rate of more than 100 g/m$^2$/day was rated "B".

2. Synthesis of Compound A (Urethane Acrylate Oligomer)

Air gas was introduced into a reaction vessel equipped with a stirrer, a thermometer, a cooling tube and a nitrogen gas inlet tube, and the reaction vessel was then charged with 10.0 parts by mass of 1,3-butanediol, 10.0 parts by mass of 1,4-butanediol, 0.1 parts by mass of p-methoxyphenol, 0.1 parts by mass of dibutyltin dilaurate and 100.0 parts by mass of methyl ethyl ketone, and the mixture was heated to 50° C. with stirring under nitrogen flow. On the other hand, 50.3 parts by mass of isophorone diisocyanate was put in a dropping vessel, and uniformly dropped into the reaction vessel over 1 hour. Here, the reaction vessel was kept at a temperature of 50±3° C. The mixture was kept hot with stirring for 1 hour, 0.1 parts by mass of p-methoxyphenol and 0.1 parts by mass of dibutyltin dilaurate were then further added, and the mixture was heated to 60° C. with stirring under nitrogen gas flow. Thereafter, 176.0 parts by mass of a mixture of pentaerythritol triacrylate and pentaerythritol tetraacrylate at a mass ratio of 80/20 in a dropping vessel was uniformly dropped into a reaction vessel with stirring over 1 hour.

After completion of the dropping, the dropping vessel was washed with 120.0 parts by mass of methyl ethyl ketone, and the solution after the washing was directly put in the reaction vessel. The mixture was kept hot with stirring for 2 hours, then heated to 75° C., and then continuously kept at a temperature of 75±3° C. with stirring until disappearance of an isocyanate-derived peak in an infrared absorption spectrum. The isocyanate-derived peak disappeared in about 4 to 6 hours. After the disappearance of the peak was confirmed, the temperature was lowered to 60° C., 7.0 parts by mass of methanol was added, and the mixture was kept at a temperature of 60±3° C. for 30 minutes. Thereafter, 120.8 parts by mass of methyl ethyl ketone was added to obtain a transparent resin solution. Finally, the solvent was removed by use of an evaporator to obtain a urethane acrylate oligomer as a compound A. The weight average molecular weight of the obtained compound A was 2000.

3. Preparation of Coating Solution (1) Coating Solution 1 for Anti-Glare Layer 5 parts of a photopolymerization initiator (trade name "ESACURE 1" manufactured by IGM Resins B.V.), 1 part by mass of particles 1 (acrylic beads, average particle size: 2.0 μm, coefficient of variation: 10.4%, refractive index: 1.535) and 1 part by mass of a leveling agent (trade name "F-568" manufactured by DIC Corporation, solid content: 5 mass %) were mixed with 100 parts by mass of the compound A in terms of solid resin content. The mixture was diluted to a solid content concentration of 50 mass % with a mixed solvent of methyl ethyl ketone and cyclopentanone at a mass ratio of 70/30 to prepare a coating solution 1 for an anti-glare layer.

(2) Coating Solution 2 for Anti-Glare Layer

A coating solution 2 for an anti-glare layer was prepared in the same manner as in (1) except that the content of the particles 1 based on 100 parts by mass of the compound A in terms of resin solid content was changed to 3 parts by mass.

(3) Coating Solution 3 for Anti-Glare Layer

A coating solution 3 for an anti-glare layer was prepared in the same manner as in (1) except that the particles 1 were changed to particles 2 (acrylic beads, average particle size: 3.0 μm, coefficient of variation: 9.8%, refractive index: 1.535) and the content of the particles 2 based on 100 parts by mass of the compound A in terms of resin solid content was changed to 3 parts by mass.

(4) Coating Solution 4 for Anti-Glare Layer

A coating solution 4 for an anti-glare layer was prepared in the same manner as in (1) except that the particles 1 were changed to particles 2 (acrylic beads, average particle size: 3.0 μm, coefficient of variation: 9.8%, refractive index: 1.535) and the content of the particles 2 based on 100 parts by mass of the compound A in terms of resin solid content was changed to 5 parts by mass.

(5) Coating Solution 5 for Anti-Glare Layer

A coating solution 5 for an anti-glare layer was prepared in the same manner as in (1) except that the particles 1 were changed to particles 3 (acrylic beads, average particle size: 3.5 μm, coefficient of variation: 10.7%, refractive index: 1.535) and the content of the particles 3 based on 100 parts by mass of the compound A in terms of resin solid content was changed to 5 parts by mass.

(6) Coating Solution 6 for Anti-Glare Layer

A coating solution 6 for an anti-glare layer was prepared in the same manner as in (1) except that the particles 1 were changed to particles 2 (acrylic beads, average particle size: 3.0 μm, coefficient of variation: 9.8%, refractive index: 1.535) and the content of the particles 2 based on 100 parts by mass of the compound A in terms of resin solid content was changed to 4 parts by mass.

(7) Coating Solution 7 for Anti-Glare Layer

A coating solution 7 for an anti-glare layer was prepared in the same manner as in (1) except that the particles 1 were changed to particles 2 (acrylic beads, average particle size: 3.0 μm, coefficient of variation: 9.8%, refractive index: 1.535) and the content of the particles 2 based on 100 parts by mass of the compound A in terms of resin solid content was changed to 2 parts by mass.

(8) Coating Solution 1 for Low Refractive Index Layer 0.1 parts by mass of a photopolymerization initiator (trade name "Omnirad 127" manufactured by IGM Resins B.V.), 1.6 parts by mass of hollow silica particles (average particle size: 60 nm, refractive index: 1.212), 0.7 parts by mass of solid silica particles (average particle size: 15 nm) and 0.01 parts by mass of a leveling agent (trade name "X-22-164E" manufactured by Shin-Etsu Silicone) were mixed with 1 part by mass of the compound (A) in terms of resin solid content.

The mixture was diluted to a solid content concentration of 5 mass % with a mixed solvent of methyl isobutyl ketone and propylene glycol monomethyl ether acetate at a mass ratio of 70/30 to prepare a coating solution 1 for a low refractive index layer.

(9) Coating Solution 2 for Low Refractive Index Layer

A coating solution 2 for a low refractive index layer was prepared in the same manner as in (8) except that the mixed solvent was changed to a mixed solvent of methyl isobutyl ketone and propylene glycol monomethyl ether propionate at a mass ratio of 70/30.

(10) Coating Solution 3 for Low Refractive Index Layer

A coating solution 3 for a low refractive index layer was prepared in the same manner as in (8) except that the mixed solvent was changed to a mixed solvent of methyl ethyl ketone and propylene glycol monomethyl ether acetate at a mass ratio of 70/30.

(11) Coating Solution 4 for Low Refractive Index Layer 0.1 parts by mass of a photopolymerization initiator (trade name "Omnirad 127" manufactured by IGM Resins B.V.), 1.6 parts by mass of hollow silica particles (average particle size: 60 nm, refractive index: 1.212), 0.7 parts by mass of solid silica particles (average particle size: 15 nm) and 0.01 parts by mass of a leveling agent (trade name "X-22-164E" manufactured by Shin-Etsu Silicone) were mixed with 1 part by mass of pentaerythritol triacrylate. The mixture was diluted to a solid content concentration of 5 mass % with a mixed solvent of methyl isobutyl ketone and propylene glycol monomethyl ether acetate at a mass ratio of 70/30 to prepare a coating solution 4 for a low refractive index layer. (The coating solution 4 for a low refractive index layer is the same as the coating solution 1 for a low refractive index layer except that the compound A is changed to pentaerythritol triacrylate).

4. Production and Provision of Polyester Film

[Polyester Film 1 (Substrate Used in Example 7)]

1 kg of PET (melting point: 258° C., absorption central wavelength: 320 nm) and 0.1 kg of an ultraviolet ray absorbent (2,2'-(1,4-phenylene)bis(4H-3,1-benzoxazinon-4-one) were melted and mixed at 280° C. with a kneader to produce pellets containing an ultraviolet ray absorbent. The pellets and PET having a melting point of 258° C. were put in a single-screw extruder, melted and kneaded at 280° C., extruded through a T die, and cast onto a casting drum controlled to have a surface temperature of 25° C., thereby obtaining a cast film. The amount of the ultraviolet ray absorbent in the cast film was 1 part by mass based on 100 parts by mass of PET.

The obtained cast film was heated with a group of rolls set at 95° C., and the film was then stretched at a ratio of 3.6 in a running direction with heat applied from both the front and rear sides of the film by a radiation heater so that the film temperature at a position of 180 mm away from the start point of the 480 mm stretching zone and within the stretching zone was 103° C. Thereafter, the film was cooled on a temporary basis. The time during which the cast film passes through the stretching zone in the running direction in Example 1 is 0.192 seconds. The stretching zone has a stretching roll A at the start point and a stretching roll B at the end point, and the stretching rolls A and B each include two nip rolls.

Subsequently, both surfaces of the uniaxially stretched film were subjected to corona discharge treatment in the air, the wetting tension of the substrate film was set to 55 mN/m, and both the corona-treated surfaces of the film were inline-coated with "a polyester resin having a glass transition temperature of 18° C., a polyester resin having a glass transition temperature of 82° C. and a coating solution for an easily slidable layer which contains silica particles having an average particle size of 100 nm", thereby forming an easily slidable layer.

Subsequently, the uniaxially stretched film was guided to a tenter, preheated with hot air at 95° C., and then stretched at a ratio of 4.9 in the film width direction at temperatures of 105° C. in the first stage and 140° C. in the second stage. Here, the film was stretched in two stages such that the amount of stretching of the film at the middle point in the lateral stretching zone was 80% of the amount of stretching at the end of the lateral stretching zone when the lateral stretching zone is divided into two parts. The term "amount of stretching" means a difference between the film width at the measurement point and the film width before stretching. The laterally stretched film was directly heat-treated in the tenter with hot air with the heat treatment temperature rising step by step from 180° C. to 245° C., subsequently relaxed by 1% in the width direction under the same temperature condition, rapidly cooled to 100° C., then relaxed by 1% in the width direction, and then rolled up to obtain a 40 μm-thick polyester film 1.

In the manner described in the text of the specification, $E_{0\text{-}20}$ of the polyester film 1 was measured. $E_{0\text{-}20}$ of the polyester film 1 was 2.05 μm/g.

[Polyester Film 2 (Substrate Used in Example 8)]

A 40 μm-thick polyester film 2 was produced in the same manner as in the case of the polyester film 1 except that the length of the stretching zone in the running direction was changed from 480 mm to 460 mm, and the stretching ratio in the width direction was changed from 4.9 to 5.1. For the polyester film 2, the time during which the cast film passes through the stretching zone in the running direction is 0.184 seconds.

In the manner described in the text of the specification, $E_{0\text{-}20}$ of the polyester film 2 was measured. $E_{0\text{-}20}$ of the polyester film 2 was 1.89 μm/g.

[Polyester Film 3 (Substrate Used in Example 9)]

A 40 μm-thick polyester film 3 was produced in the same manner as in the case of the polyester film 1 except that the length of the stretching zone in the running direction was changed from 480 mm to 450 mm, and the stretching ratio in the width direction was changed from 4.9 to 5.3. For the polyester film 3, the time during which the cast film passes through the stretching zone in the running direction is 0.180 seconds.

In the manner described in the text of the specification, $E_{0\text{-}20}$ of the polyester film 3 was measured. $E_{0\text{-}20}$ of the polyester film 3 was 1.67 μm/g.

[Polyester Film 4 (Substrate Used in Example 12)]

A commercially available biaxially stretched polyester film (trade name "COSMOSHAINE A4360" manufactured by TOYOBO CO., LTD.), thickness: 50 μm) was provided as a polyester film 4.

In the manner described in the text of the specification, $E_{0\text{-}20}$ of the polyester film 4 was measured. $E_{0\text{-}20}$ of the polyester film 4 was 0.97 μm/g.

5. Production of Anti-Glare Antireflection Member

Example 1

The coating solution 1 for an anti-glare layer was applied onto the substrate (80 μm-thick triacetyl cellulose film, in-plane phase difference: 2 nm, tensile elastic modulus: 4.3 GPa, water-vapor transmission rate: 487 g/m$^2$/day) to a wet mass of 10 g/m$^2$, dried at 80° C. for 30 seconds, and then irradiated with an ultraviolet ray at 100 mJ/cm$^2$ to form an anti-glare layer having a dry thickness of 5 µm. The direction of drying wind was substantially horizontal to the substrate conveyance direction and counter to the substrate conveyance direction. The drying wind speed was 30 m/s. The substrate conveyance speed was 20 m/min.

Subsequently, the coating solution 1 for the low refractive index layer was applied onto the anti-glare layer to a wet mass of 2 g/m$^2$, dried at 60° C. for 30 seconds, and then irradiated with an ultraviolet ray at 200 mJ/cm$^2$ to form a low refractive index layer having an average thickness of 100 nm, thereby obtaining an anti-glare antireflection member of Example 1. The direction of drying wind was substantially horizontal to the substrate conveyance direction and counter to the substrate conveyance direction. The drying wind speed was 25 m/s.

After formation of the anti-glare layer and before application of the coating solution for a low refractive index layer, heat was applied from a surface on the substrate side, so that the substrate temperature at the time of application of the coating solution 1 for a low refractive index layer onto the anti-glare layer was 40° C.

Examples 2 to 6

Anti-glare antireflection members of Examples 2 to 6 were produced in the same manner as in Example 1 except that as the coating solution for an anti-glare layer, the following coating solutions for an anti-glare layer were used.

Coating solution for an anti-glare layer in Example 2: coating solution 2 for an anti-glare layer
Coating solution for an anti-glare layer in Example 3: coating solution 3 for an anti-glare layer
Coating solution for an anti-glare layer in Example 4: coating solution 4 for an anti-glare layer
Coating solution for an anti-glare layer in Example 5: coating solution 6 for an anti-glare layer
Coating solution for an anti-glare layer in Example 6: coating solution 7 for an anti-glare layer Examples 7 to 12

Anti-glare antireflection members of Examples 7 to 12 were produced in the same manner as in Example 3 except that the substrate was changed to the following substrates.

Substrate in Example 7: polyester film 1 (in-plane phase difference: 502 nm, tensile elastic modulus: 4.8 GPa, water-vapor transmission rate: 58 g/m$^2$/day, thickness: 40 µm, $E_{0-20}$: 2.05 µm/g, pencil hardness: F (5 rounds/5 rounds))

Substrate in Example 8: polyester film 2 (in-plane phase difference: 982 nm, tensile elastic modulus: 4.8 GPa, water-vapor transmission rate: 55 g/m$^2$/day, thickness: 40 µm, $E_{0-20}$: 1.89 µm/g, pencil hardness: F (5 rounds/5 rounds))

Substrate in Example 9: polyester film 3 (in-plane phase difference: 1597 nm, tensile elastic modulus: 4.9 GPa, water-vapor transmission rate: 57 g/m$^2$/day, thickness: 40 µm, $E_{0-20}$: 1.67 µm/g, pencil hardness: F (4 rounds/5 rounds))

Substrate in Example 10: 40 µm-thick acrylic film (in-plane phase difference: 3 nm, tensile elastic modulus: 2.6 GPa, water-vapor transmission rate: 85 g/m$^2$/day, thickness: 40 µm)

Substrate in Example 11: 47 µm-thick cycloolefin film (in-plane phase difference: 99 nm, tensile elastic modulus: 3.0 GPa, water-vapor transmission rate: 38 g/m$^2$/day, thickness: 47 µm)

Substrate in Example 12: polyester film 4 (in-plane phase difference: 1899 nm, tensile elastic modulus: 4.8 GPa, water-vapor transmission rate: 55 g/m$^2$/day, thickness: 50 µm, $E_{0-20}$: 0.97 µm/g, pencil hardness: 3B (5 rounds/5 rounds))

<Pencil Hardness>

Each of the polyester films 1 to 4 as the substrates in Examples 7 to 9 and 12, respectively, was heated at 100° C. for 10 minutes. A pencil hardness test was conducted on the heated polyester film.

The pencil hardness test was conducted similarly to the pencil hardness test specified in JIS K5600-5-4: 1999 with the exception that the load, the speed and the requirement were changed from those of the JIS provisions. Specifically, the load was 100 g, and the speed was 3 mm/s. The test piece was heated again at 100° C. for 10 minutes after application of a load to a polyester film as a sample and before visual evaluation for scratches. Subsequently, visual evaluation for scratches on the heated sample was performed. The requirement for acceptance was that the sample is not scratched in 3 or more out of 5 rounds of evaluation. For example, an evaluation method was adopted in which when the sample is not scratched at 2B hardness in 3 or more out of 5 rounds, the sample was determined as being acceptable at 2B hardness, and subjected to a test at a hardness higher by one rank.

In the explanation of the substrate in Examples 7 to 9 and 12 above, the pencil hardness of each sample, and the number of rounds out of 5 rounds of evaluation, in which the sample was not scratched, are shown.

At F pencil hardness, a sample which is not scratched in 3 or more out of 5 rounds of evaluation is acceptable.

Comparative Example 1

An anti-glare antireflection member of Comparative Example 1 was produced in the same manner as in Example 1 except that the coating solution 1 for an anti-glare layer was changed to the coating solution 5 for an anti-glare layer.

Comparative Example 2

An anti-glare antireflection member of Comparative Example 2 was produced in the same manner as in Example 1 except that the coating solution 1 for an anti-glare layer was changed to the coating solution 4 for an anti-glare layer, and the coating solution 1 for a low refractive index layer was changed to the coating solution 2 for a low refractive index layer.

Comparative Example 3

An anti-glare antireflection member of Comparative Example 3 was produced in the same manner as in Example 1 except that the coating solution 1 for a low refractive index layer was changed to the coating solution 3 for a low refractive index layer.

Comparative Example 4

An anti-glare antireflection member of Comparative Example 4 was produced in the same manner as in Example 1 except that the coating solution 1 for an anti-glare layer was changed to the coating solution 4 for an anti-glare layer, and the coating solution 1 for a low refractive index layer was changed to the coating solution 4 for a low refractive index layer.

Comparative Example 5

An anti-glare antireflection member of Comparative Example 5 was produced in the same manner as in Example 1 except that heating from a surface on the substrate side was not performed after formation of the anti-glare layer and before application of the coating solution for a low refractive index layer, and the substrate temperature at the time of applying the coating solution 1 for the low refractive index layer was changed to 20° C.

Comparative Example 6

An anti-glare antireflection member of Comparative Example 6 was produced in the same manner as in Example 3 except that the direction of drying wind for drying the coating solution for a low refractive index layer was changed to a direction vertical to the substrate, and the wind speed was changed to 10 m/s.

Table 1 shows a part of materials and production conditions in Examples 1 to 12 and Comparative Examples 1 to 6.

TABLE 1

| | Anti-glare layer | | | Low refractive index layer | | | |
|---|---|---|---|---|---|---|---|
| | Resin | Average particle size of particles | Amount of particles added | Resin | Solvent | Substrate temperature | Direction of drying wind |
| Example 1 | Compound A | 2.0 μm | 1 part by mass | Compound A | MIBK/PGM-A | 40° C. | Horizontal |
| Example 2 | Compound A | 2.0 μm | 3 part by mass | Compound A | MIBK/PGM-A | 40° C. | Horizontal |
| Examples 3 and 7 to 12 | Compound A | 3.0 μm | 3 part by mass | Compound A | MIBK/PGM-A | 40° C. | Horizontal |
| Example 4 | Compound A | 3.0 μm | 5 part by mass | Compound A | MIBK/PGM-A | 40° C. | Horizontal |
| Example 5 | Compound A | 3.0 μm | 4 part by mass | Compound A | MIBK/PGM-A | 40° C. | Horizontal |
| Example 6 | Compound A | 3.0 μm | 2 part by mass | Compound A | MIBK/PGM-A | 40° C. | Horizontal |
| Comparative Example 1 | Compound A | 3.5 μm | 5 part by mass | Compound A | MIBK/PGM-A | 40° C. | Horizontal |
| Comparative Example 2 | Compound A | 3.0 μm | 5 part by mass | Compound A | MIBK/PGM-P | 40° C. | Horizontal |
| Comparative Example 3 | Compound A | 2.0 μm | 1 part by mass | Compound A | MEK/PGM-A | 40° C. | Horizontal |
| Comparative Example 4 | Compound A | 3.0 μm | 5 part by mass | PETA | MIBK/PGM-A | 40° C. | Horizontal |
| Comparative Example 5 | Compound A | 2.0 μm | 1 part by mass | Compound A | MIBK/PGM-A | 20° C. | Horizontal |
| Comparative Example 6 | Compound A | 3.0 μm | 3 part by mass | Compound A | MIBK/PGM-A | 40° C. | Vertical |

In Table 1, "PETA" denotes pentaerythritol triacrylate, "MIBK" denotes methyl isobutyl ketone, "PGM-A" denotes propylene glycol monomethyl ether acetate, and "PGM-P" denotes propylene glycol monomethyl ether propionate.

TABLE 2

| | | In-plane phase difference of substrate (nm) | Thickness of low refractive index layer (nm) | | | Reflectance | | Coloring in oblique direction | | | | | Luminescent spot |
|---|---|---|---|---|---|---|---|---|---|---|---|---|---|
| | | | Peak portion | Bottom portion | Δd | (%) | Evaluation | R | G | B | Total | Evaluation | Evaluation |
| Example | 1 | 2 | 95.2 | 103.2 | 8.0 | 1.15 | A | 1.370 | 1.139 | 1.015 | 3.524 | B | A |
| | 2 | 2 | 99.2 | 111.1 | 11.9 | 1.21 | A | 1.362 | 1.128 | 1.011 | 3.501 | B | A |
| | 3 | 2 | 83.3 | 109.1 | 25.8 | 1.28 | A | 1.350 | 1.116 | 1.006 | 3.472 | A | A |
| | 4 | 2 | 81.4 | 118.9 | 37.5 | 1.32 | A | 1.325 | 1.093 | 1.002 | 3.420 | A | A |
| | 5 | 2 | 80.8 | 110.5 | 29.7 | 1.29 | A | 1.358 | 1.121 | 1.009 | 3.488 | A | A |
| | 6 | 2 | 88.7 | 109.5 | 20.8 | 1.22 | A | 1.339 | 1.108 | 1.004 | 3.451 | A | A |
| | 7 | 502 | 87.0 | 111.5 | 24.5 | 1.26 | A | 1.350 | 1.111 | 1.004 | 3.465 | A | A |
| | 8 | 982 | 86.6 | 112.3 | 25.7 | 1.26 | A | 1.351 | 1.115 | 1.004 | 3.470 | A | A |
| | 9 | 1597 | 86.3 | 110.3 | 24.0 | 1.25 | A | 1.355 | 1.117 | 1.006 | 3.478 | A | A |

TABLE 2-continued

|  |  |  |  |  |  |  |  |  |  |  |  |  |  |
|---|---|---|---|---|---|---|---|---|---|---|---|---|---|
|  | 10 | 3 | 87.0 | 111.5 | 24.5 | 1.25 | A | 1.353 | 1.110 | 1.004 | 3.467 | A | A |
|  | 11 | 99 | 86.9 | 112.1 | 25.2 | 1.26 | A | 1.349 | 1.114 | 1.005 | 3.468 | A | A |
|  | 12 | 1899 | 87.2 | 112.4 | 25.2 | 1.40 | A | 1.349 | 1.112 | 1.004 | 3.465 | A | B |
| Comparative | 1 | 2 | 69.4 | 119.0 | 49.6 | 1.51 | B | 1.312 | 1.079 | 1.000 | 3.392 | A | C |
| Example | 2 | 2 | 80.1 | 121.7 | 41.6 | 1.46 | A | 1.323 | 1.091 | 1.003 | 3.417 | A | C |
|  | 3 | 2 | 96.4 | 101.9 | 5.5 | 1.12 | A | 1.374 | 1.141 | 1.018 | 3.533 | C | A |
|  | 4 | 2 | 80.1 | 122.0 | 41.9 | 1.53 | B | 1.323 | 1.090 | 1.003 | 3.416 | A | C |
|  | 5 | 2 | 97.4 | 102.3 | 4.9 | 1.10 | A | 1.375 | 1.142 | 1.018 | 3.535 | C | A |
|  | 6 | 2 | 71.5 | 120.6 | 49.1 | 1.61 | B | 1.313 | 1.080 | 1.000 | 3.393 | A | C |

|  |  | AG | | Tt | | Hz | | Tensile elastic modulus | | Water-vapor transmission rate | | Overall |
|---|---|---|---|---|---|---|---|---|---|---|---|---|
|  |  | Evaluation | (%) | Evaluation | (%) | Evaluation | (GPa) | Evaluation | (g/m²/day) | Evaluation | evaluation |
| Example | 1 | A | 94.2 | A | 1.2 | A | 4.3 | A | 487 | B | B |
|  | 2 | A | 94.1 | A | 1.5 | A | 4.3 | A | 487 | B | B |
|  | 3 | A | 94.2 | A | 2.1 | A | 4.3 | A | 487 | B | A |
|  | 4 | A | 94.2 | A | 2.4 | B | 4.3 | A | 487 | B | B |
|  | 5 | A | 94.1 | A | 2.2 | A | 4.3 | A | 487 | B | A |
|  | 6 | A | 94.2 | A | 2.1 | A | 4.3 | A | 487 | B | A |
|  | 7 | A | 94.1 | A | 2.0 | A | 4.8 | A | 58 | A | AA |
|  | 8 | A | 94.1 | A | 2.1 | A | 4.8 | A | 55 | A | AA |
|  | 9 | A | 94.2 | A | 2.0 | A | 4.9 | A | 57 | A | AA |
|  | 10 | A | 94.2 | A | 2.0 | A | 2.6 | B | 85 | A | A |
|  | 11 | A | 94.1 | A | 2.1 | A | 3 | B | 38 | A | A |
|  | 12 | A | 93.9 | A | 1.9 | A | 4.8 | A | 55 | A | A |
| Comparative | 1 | A | 93.8 | A | 8.2 | C | 4.3 | A | 487 | B | C |
| Example | 2 | A | 93.9 | A | 2.4 | B | 4.3 | A | 487 | B | C |
|  | 3 | A | 94.0 | A | 1.3 | A | 4.3 | A | 487 | B | C |
|  | 4 | A | 93.9 | A | 2.3 | B | 4.3 | A | 487 | B | C |
|  | 5 | A | 94.1 | A | 1.3 | A | 4.3 | A | 487 | B | C |
|  | 6 | A | 93.7 | A | 2.5 | B | 4.3 | A | 487 | B | C |

From Tables 1 and 2, it can be confirmed that the anti-glare antireflection members of Examples in which the average of Δd is 7.0 nm or more and 40.0 nm or less are capable of suppressing coloring in viewing in an oblique direction, and suppressing visual recognition of local luminescent spots.

The overall evaluation of Table 2 is based on the following criteria.

AA: "A" or a higher rate is assigned in all evaluations.
A: "B" is assigned in one evaluation, and "A" is assigned in all other evaluations.
B: "B" is assigned in two evaluations, and "A" is assigned in all other evaluations.
C: "C" is assigned in at least one evaluation, or "B" is assigned in three or more evaluations.

REFERENCE SIGNS LIST

100: substrate
200: anti-glare layer
210: binder resin
220: particle
300: low refractive index layer
1000: anti-glare antireflection member
2000: sample A1
11: vessel
12: reception vessel
21: test liquid pipe
22: compressed air pipe
23: returning pipe
31, 32: flowmeter
41, 42: pressure gauge
50: spraying unit
51: nozzle
52: housing
60: cross-section profile acquiring unit
70: plastic film
81: specimen mounting table
82: support
500: erosion ratio measurement apparatus
A1: water
A2: spherical silica
A3: air
A4: abraded plastic film

The invention claimed is:

1. An anti-glare antireflection member comprising:
an anti-glare layer, and
a low refractive index layer on a substrate,
wherein the low refractive index layer comprises a binder resin, hollow particles and non-hollow particles,
wherein the substrate is a plastic film having an average erosion ratio from a surface to a depth of 20 μm of 1.4 μm/g or more, and
wherein an average of Δd is 7.0 nm or more and 40.0 nm or less, where Δd is a thickness difference of the low refractive index layer in an arbitrary 2 mm×2 mm region of the anti-glare antireflection member.

2. The anti-glare antireflection member according to claim 1, wherein the anti-glare layer comprises a binder resin and particles.

3. The anti-glare antireflection member according to claim 1, wherein the hollow particles are hollow silica particles, and the non-hollow particles are non-hollow silica particles.

4. The anti-glare antireflection member according to claim 1, wherein an average of a thickness of the low refractive index layer is 80 nm or more and 120 nm or less.

5. The anti-glare antireflection member according to claim 1, wherein the anti-glare layer and the low refractive index layer are in contact with each other.

6. The anti-glare antireflection member according to claim 1, having a luminous reflectance Y value of 3% or less, as measured at an incident angle of light of 5 degrees from the side of the low refractive index layer provided.

7. The anti-glare antireflection member according to claim 1, having a haze of 0.3% or more and 10% or less, as determined according to JIS K7136:2000.

8. The anti-glare antireflection member according to claim 1, wherein the substrate is a plastic film.

9. A polarizing plate comprising a polarizer, a first transparent protection plate arranged on one side of the polarizer, and a second transparent protection plate arranged on the other side of the polarizer, wherein at least one selected from the group consisting of the first transparent protection plate and the second transparent protection plate is the anti-glare antireflection member according to claim 1, and the anti-glare antireflection member is arranged so that the surface on the low refractive index layer side faces the opposite side of the polarizer.

10. A surface plate for an image display device in which an anti-glare antireflection member is bonded on a resin plate or a glass plate, wherein the anti-glare antireflection member is the anti-glare antireflection member according to claim 1, and the anti-glare antireflection member is arranged so that the surface on the low refractive index layer side faces the opposite side of the resin plate or the glass plate.

11. An image display device comprising the anti-glare antireflection member according to claim 1 arranged on a display element such that the low refractive index layer side faces the opposite side of the display element, and the anti-glare antireflection member is arranged on a surface of the image display device.

12. A method for selecting an anti-glare antireflection member, comprising the following (1) and (2):

(1) measuring a thickness difference $\Delta d$ of a low refractive index layer in an arbitrary 2 mm×2 mm region of an anti-glare antireflection member comprising an anti-glare layer and the low refractive index layer on a substrate, wherein the low refractive index layer comprises a binder resin, hollow particles and non-hollow particles, wherein the substrate is a plastic film having an average erosion ratio from a surface to a depth of 20 µm of 1.4 µm/g or more, and calculating an average of $\Delta d$; and (2) selecting an anti-glare antireflection member satisfying a requirement that the average of $\Delta d$ be 7.0 nm or more and 40.0 nm or less.

* * * * *